(12) United States Patent
Fujioka

(10) Patent No.: US 12,542,858 B2
(45) Date of Patent: Feb. 3, 2026

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Masaki Fujioka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 18/672,938

(22) Filed: May 23, 2024

(65) Prior Publication Data

US 2024/0406331 A1 Dec. 5, 2024

(30) Foreign Application Priority Data

May 29, 2023 (JP) .................... 2023-087974

(51) Int. Cl.
*H04N 1/32* (2006.01)
*H04N 23/63* (2023.01)
*H04N 101/00* (2006.01)

(52) U.S. Cl.
CPC ..... *H04N 1/32117* (2013.01); *H04N 1/32112* (2013.01); *H04N 23/633* (2023.01); *H04N 2101/00* (2013.01); *H04N 2201/3229* (2013.01); *H04N 2201/3247* (2013.01)

(58) Field of Classification Search
CPC .......... H04N 1/32112; H04N 1/32117; H04N 23/633; H04N 2201/3229; H04N 2201/3247
See application file for complete search history.

(56) References Cited

U.S. PATENT DOCUMENTS

| | | | |
|---|---|---|---|
| 2015/0170710 A1* | 6/2015 | Horita .................. | G11B 27/322 386/241 |
| 2020/0162744 A1* | 5/2020 | Iwata .................... | H04N 19/137 |
| 2024/0395288 A1* | 11/2024 | Yoshioka .............. | G11B 27/031 |

FOREIGN PATENT DOCUMENTS

JP     2003134435 A     5/2003

* cited by examiner

*Primary Examiner* — Daniel M Pasiewicz
(74) *Attorney, Agent, or Firm* — Canon U.S.A., Inc., IP Division

(57) ABSTRACT

A communication apparatus includes a reception unit which receives a notification from an image capturing apparatus, and a control unit. If the received notification indicates that a divided moving image file to be generated using a chunk recording method has been generated, the control unit requests the divided moving image file from the image capturing apparatus. If the received notification indicates that a metadata file associated with the divided moving image file has been generated, the control unit does not request the metadata file from the image capturing apparatus. If the received notification indicates that a metadata file associated with the divided moving image file has been updated, the control unit requests the metadata file from the image capturing apparatus.

12 Claims, 14 Drawing Sheets

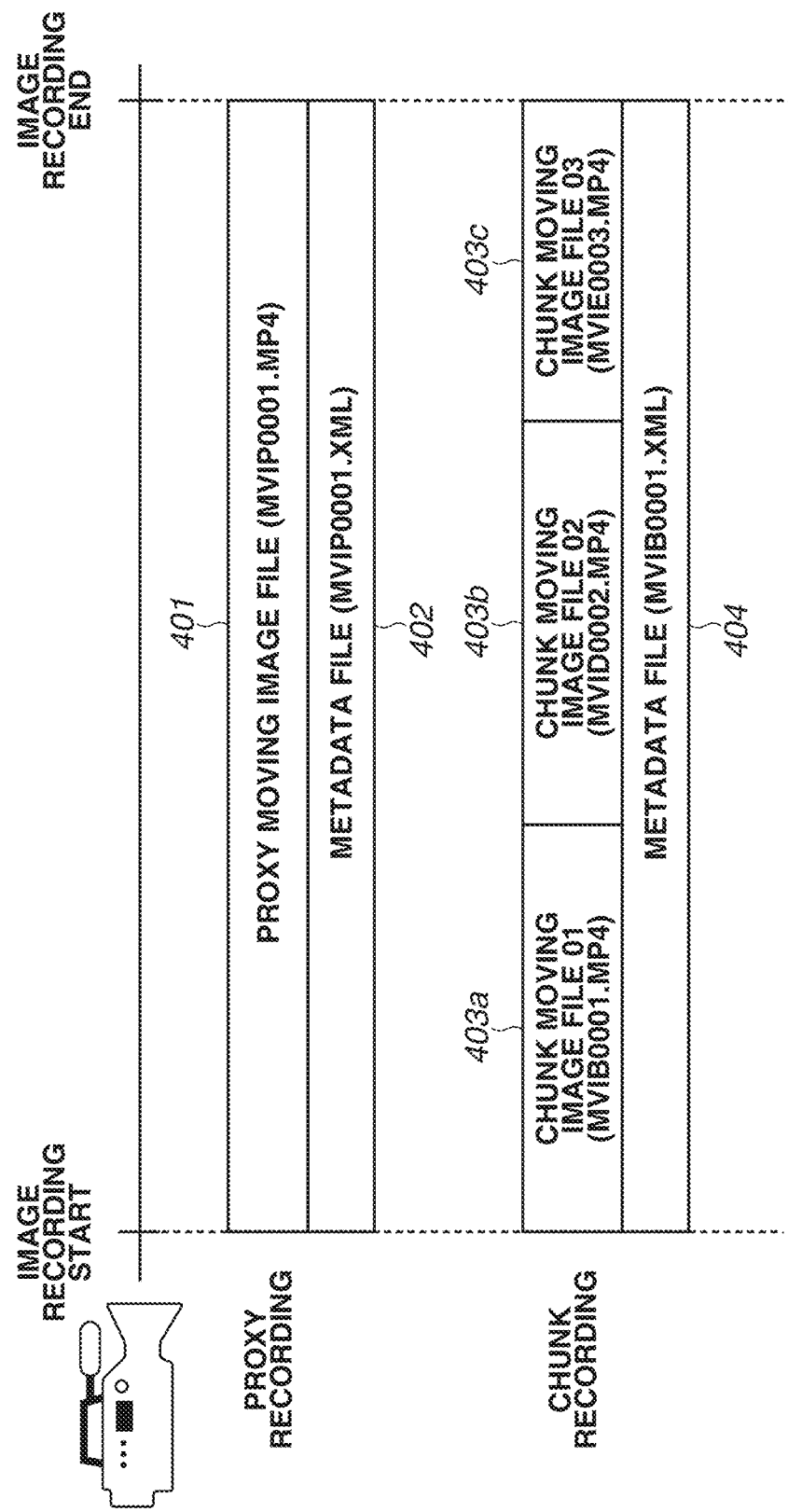

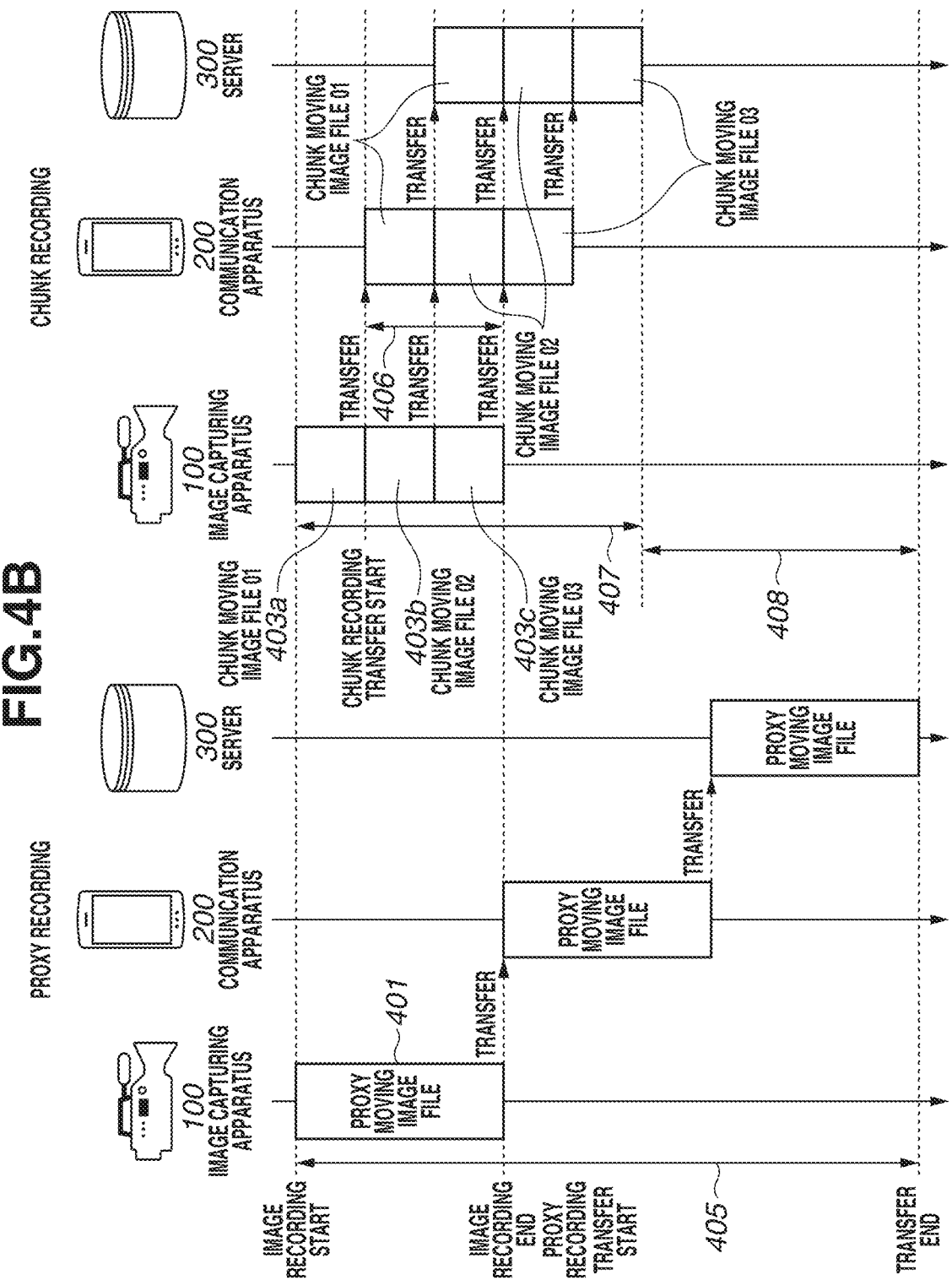

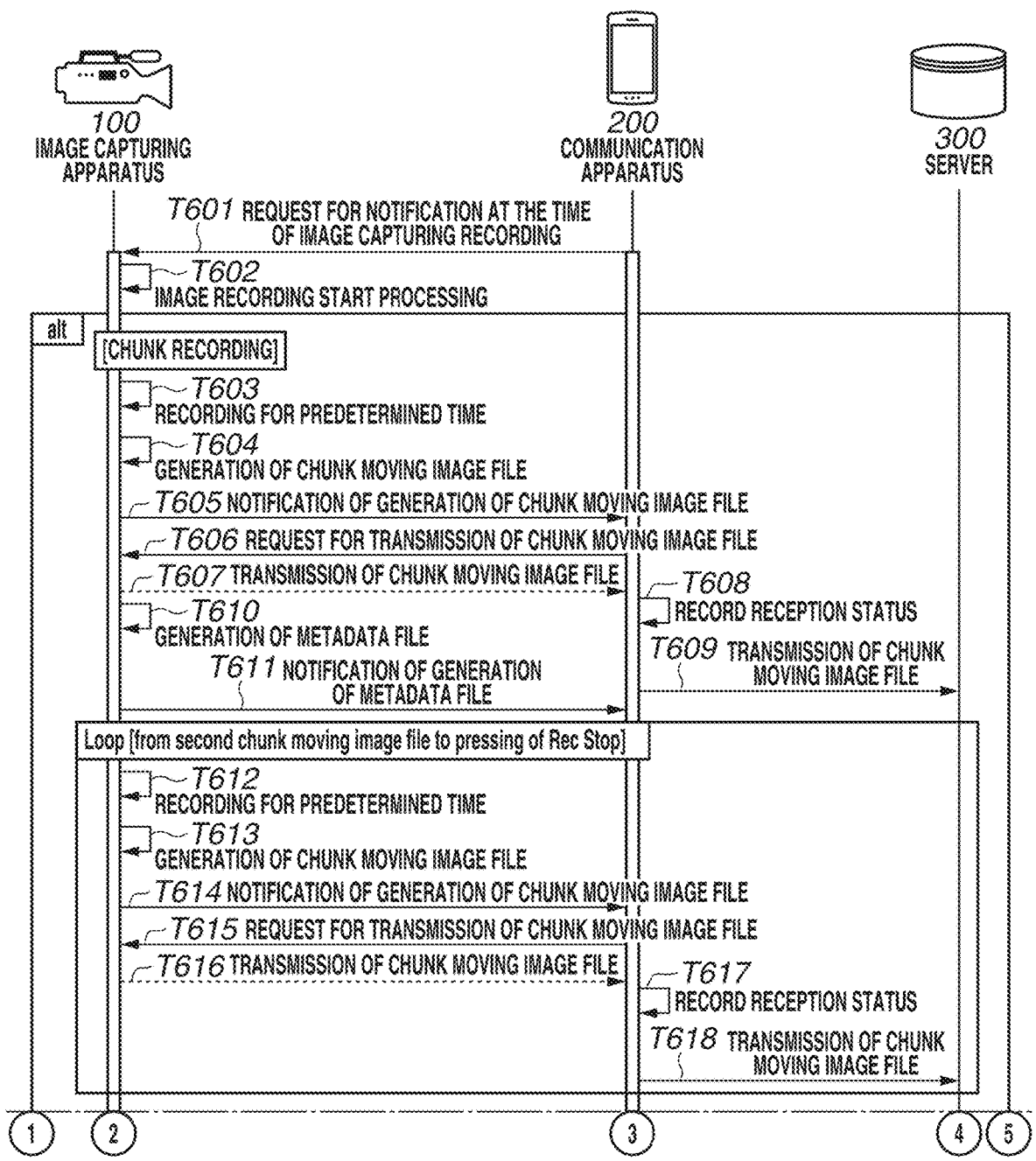

FIG.8A
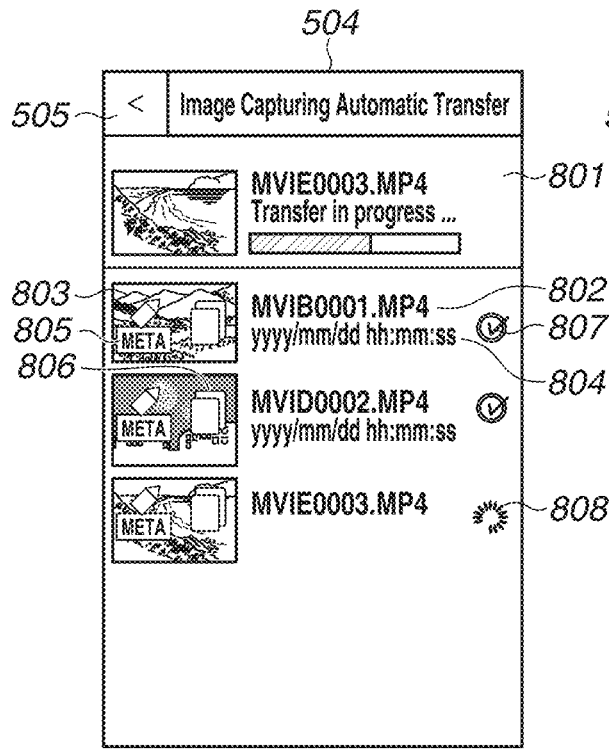
FIG.8C
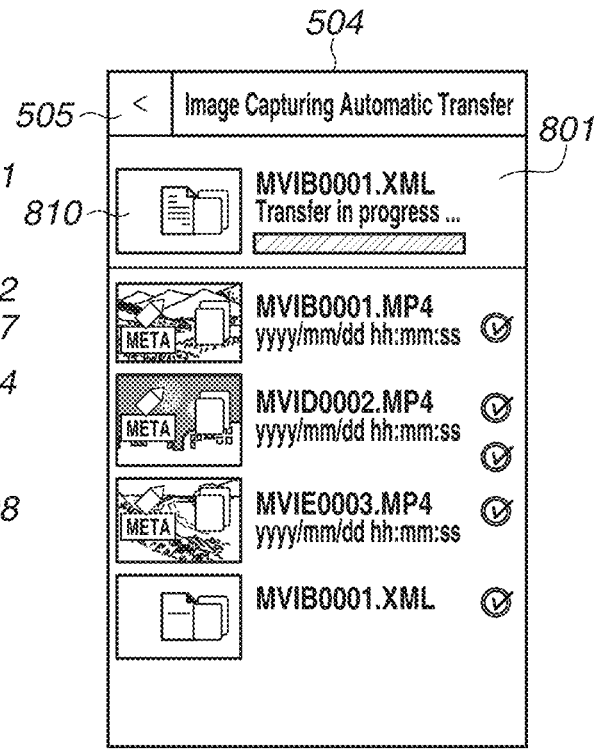
FIG.8B
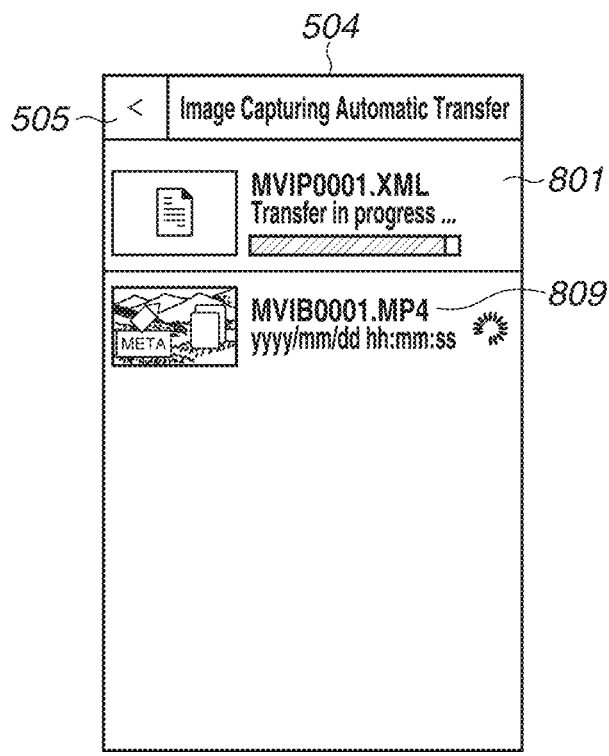
FIG.8D
| FILE NAME | EXTENSION | CREATION DATE AND TIME | UPDATING DATE AND TIME |
|---|---|---|---|
| MVIB0001 | MP4 | 2023.01.02 09:30:20 | |
| MVID0002 | MP4 | 2023.01.02 09:30:50 | |
| MVIE0003 | MP4 | 2023.01.02 09:31:15 | |
| MVIB0001 | XML | 2023.01.02 09:30:21 | 2023.01.02 09:31:16 |

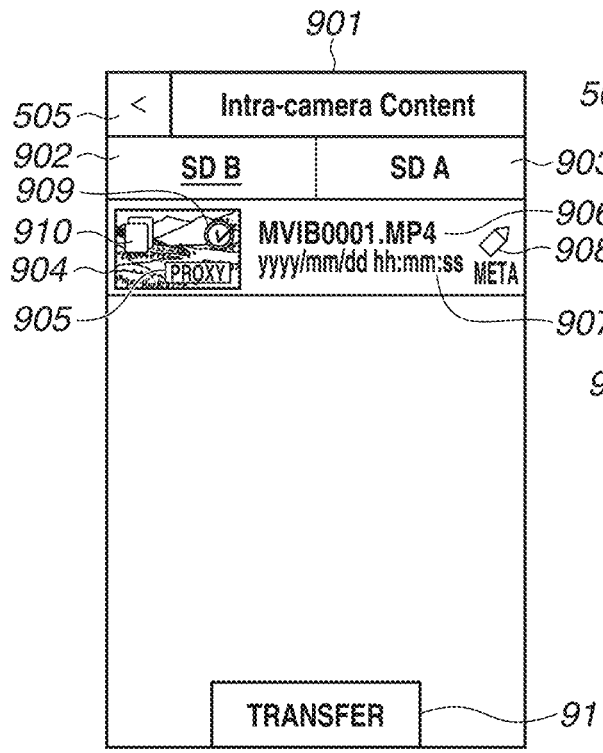
FIG.9A
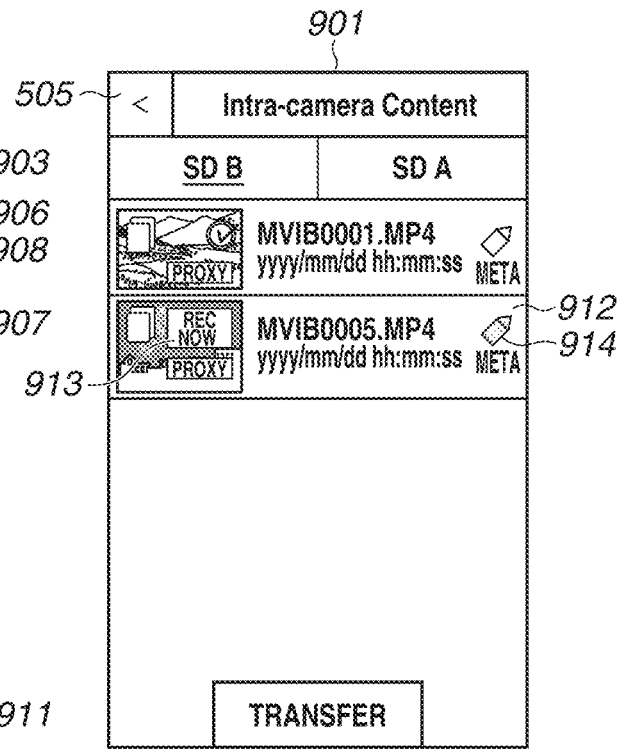
FIG.9C
FIG.9B
| FILE NAME | EXTENSION | CREATION DATE AND TIME | UPDATING DATE AND TIME |
|---|---|---|---|
| MVIB0001 | MP4 | 2023.01.020 9:30:20 | |
| MVID0002 | MP4 | 2023.01.02 09:30:50 | |
| MVIE0003 | MP4 | 2023.01.02 09:31:15 | |
| MVIB0001 | XML | 2023.01.02 09:30:21 | 2023.01.02 09:31:16 |
| MVIB0005 | MP4 | 2023.01.02 09:35:20 | |
| MVIB0005 | XML | 2023.01.02 09:35:21 | |
| MVID0006 | MP4 | 2023.01.02 09:35:50 | |
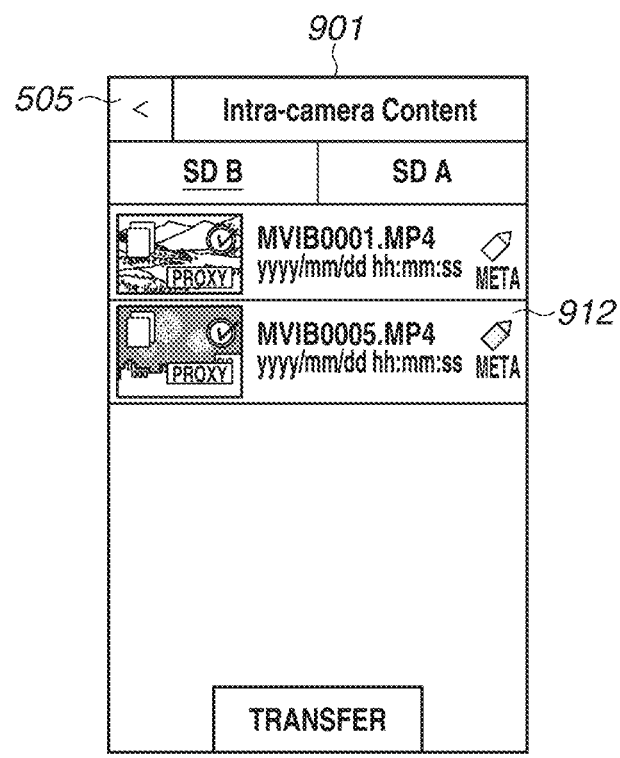
FIG.9D

COMMUNICATION APPARATUS, CONTROL METHOD FOR COMMUNICATION APPARATUS, AND STORAGE MEDIUM

BACKGROUND

Field

Aspects of the present disclosure generally relate to a communication apparatus capable of connecting to an external apparatus via wireless communication.

Description of the Related Art

There is known a technique which equips an image capturing apparatus such as a digital video camera with a wireless communication function, generates moving image files for recording obtained by dividing a moving image input from the image capturing apparatus with a predetermined time, and transmits the generated moving image files to an external apparatus, as discussed in Japanese Patent Application Laid-Open No. 2003-134435.

In the technique discussed in Japanese Patent Application Laid-Open No. 2003-134435, in response to moving image files for recording obtained by dividing the moving image being generated, metadata files associated with the respective moving image files are also generated. However, in the case of moving image files for recording obtained by dividing the moving image such as in the technique discussed in Japanese Patent Application Laid-Open No. 2003-134435, there is also information which becomes understandable only after the whole of the moving image has been completely generated. Moreover, since the division into files is performed so as to smoothly implement communications, it is not necessary for an apparatus which has finished receiving the files to treat the files while maintaining the divisional state thereof. Thus, performing transmission and reception of metadata files associated with the respective moving image files every time each of the metadata files is generated may be considered inefficient.

SUMMARY

According to an aspect of the present disclosure, a communication apparatus includes at least one memory storing instructions, and at least one processor that, upon execution of the stored instructions is configured to operate as a reception unit configured to receive a notification transmitted from an image capturing apparatus, and a control unit configured to, wherein, when the received notification indicates that a divided moving image file to be generated using a first recording method which continues moving image recording from when the image capturing apparatus receives an instruction for recording from a user until the image capturing apparatus receives an instruction for ending of recording from the user, and generates divided moving image files for every predetermined time or for every predetermined size has been generated, perform control to request the divided moving image file from the image capturing apparatus, wherein, when the received notification indicates that a metadata file associated with the divided moving image file has been generated, perform control not to request the metadata file from the image capturing apparatus, and wherein, when the received notification indicates that a metadata file associated with the divided moving image file has been updated, perform control to request the metadata file from the image capturing apparatus.

Further features of the present disclosure will become apparent from the following description of exemplary embodiments with reference to the attached drawings.

BRIEF DESCRIPTION OF THE DRAWINGS

FIGS. 4A and 4B are diagrams used to explain features of chunk recording in the first exemplary embodiment.

FIGS. 6A and 6B are sequence diagrams of transfer processing for chunk recording files between the image capturing apparatus, the communication apparatus, and a server in the first exemplary embodiment.

FIGS. 8A, 8B, 8C, and 8D are diagrams illustrating a list of chunk recording files and a metadata file which have been transferred by the communication apparatus and examples of screens of the transfer application displayed after the transfer thereof in the first exemplary embodiment.

FIGS. 9A, 9B, 9C, and 9D are diagrams illustrating a list of chunk recording files and metadata files and examples of screens of a transfer application which are displayed by a communication apparatus in a second exemplary embodiment.

DESCRIPTION OF THE EMBODIMENTS

Various exemplary embodiments, features, and aspects of the disclosure will be described in detail below with reference to the drawings.

Furthermore, exemplary embodiments to be described below are examples of implementations of the present disclosure, and can be modified or altered as appropriate according to configurations of an apparatus to which the present disclosure is applied and various conditions for the apparatus. Moreover, some or all of the exemplary embodiments can be combined as appropriate.

<Configuration of System>

Figure 1:
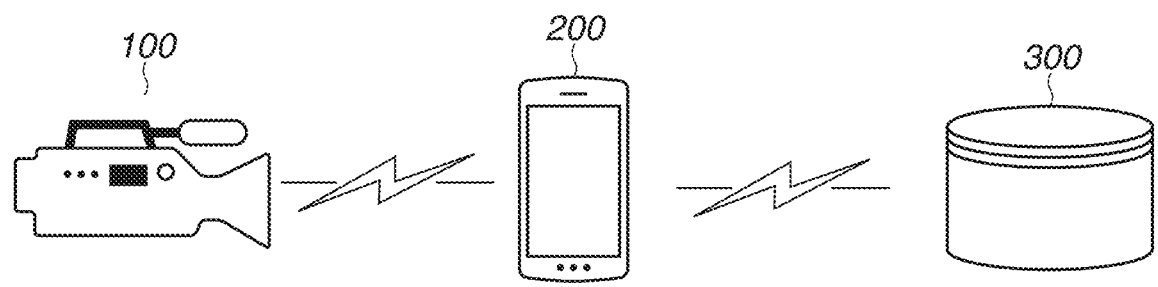
FIG. 1 is a conceptual diagram illustrating a system configuration in a first exemplary embodiment.

FIG. 1 is a schematic diagram used to explain a system configuration according to a first exemplary embodiment of the present disclosure.

Referring to FIG. 1, the system includes an image capturing apparatus 100 such as a digital video camera. The system further includes a communication apparatus 200 serving as a mobile terminal, which is an information processing apparatus equipped with a communication function typified by, for example, a smartphone or computer. The system further includes a server 300, which is an image storage device installed at a connection destination to be connected via a communication network such as the Internet.

Referring to FIG. 1, the image capturing apparatus 100 and the communication apparatus 200 are interconnected by wired communication or wireless communication via a connection method such as a wired cable or Wi-Fi, thus enabling moving image files and metadata files generated by the image capturing apparatus 100 to be transferred to the communication apparatus 200.

The communication apparatus 200 and the server 300 are interconnected via a connection method such as mobile data communication, thus enabling information stored in the communication apparatus 200 to be transferred to the server 300 via communication such as the File Transfer Protocol (FTP).

Furthermore, the system configuration is not limited to the above-mentioned configuration, and, for example, without the use of mobile data communication, the image capturing apparatus 100, the communication apparatus 200, and the server 300 can be connected to the same network via an access point, thus implementing transfer processing for files between the respective apparatuses.

<Configuration of Image Capturing Apparatus>

Figure 2A:
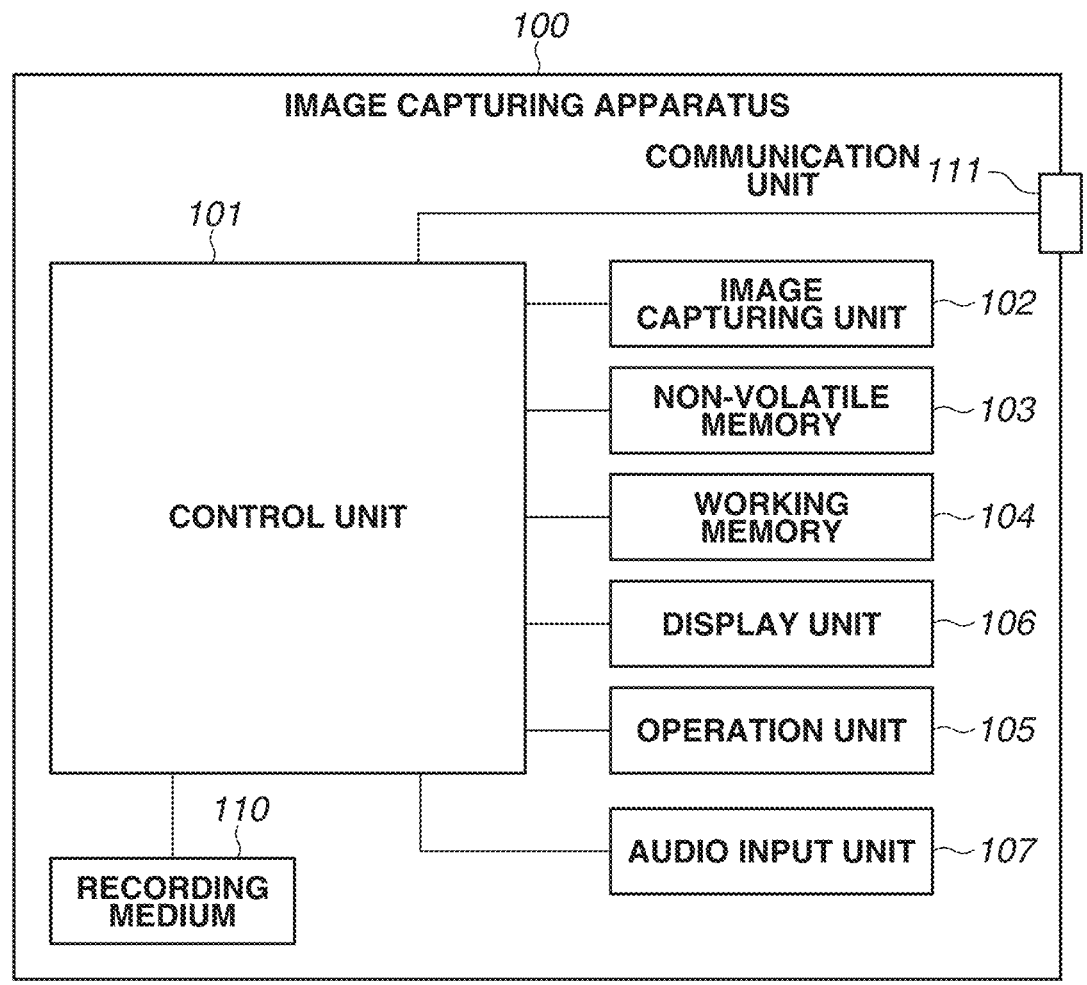
FIG. 2A is a block diagram illustrating a configuration of an image capturing apparatus in the first exemplary embodiment.

FIG. 2A is a block diagram illustrating a hardware configuration example of the image capturing apparatus 100 in the first exemplary embodiment. Furthermore, while, here, a digital video camera is described as an example of the image capturing apparatus 100, the image capturing apparatus 100 is not limited to this. For example, the image capturing apparatus 100 can be a portable-type media player or an information processing apparatus such as what is called a tablet device or a personal computer.

A control unit 101 is one or more processors which control each unit of the image capturing apparatus 100 according to an input signal or a program described below. Furthermore, instead of the control unit 101 controlling the entire image capturing apparatus 100, a plurality of hardware pieces can be configured to share the processing to control the entire image capturing apparatus 100.

An image capturing unit 102 is configured with, for example, an optical lens unit, an optical system which controls, for example, an aperture, zooming, and focusing, and an image sensor which converts light (video image) introduced via the optical lens unit into an electrical video signal. The image sensor to be used is, for example, a complementary metal-oxide semiconductor (CMOS) sensor or a charge-coupled device (CCD) sensor. The image capturing unit 102 is controlled by the control unit 101 to convert subject light formed as an image by the lens unit included in the image capturing unit 102 into an electrical signal with the image sensor, perform, for example, noise reduction processing on the electrical signal, and output the thus-obtained digital data as moving image data. In the case of the image capturing apparatus 100 in the first exemplary embodiment, the moving image data is then recorded on a recording medium 110.

A non-volatile memory 103 is an electrically erasable and recordable non-volatile memory, in which, for example, a program described below which is executed by the control unit 101 and metatemplate information are stored.

A working memory 104 is used as, for example, a buffer memory which temporarily retains moving image data captured by the image capturing unit 102, a memory for displaying a moving image on a display unit 106, and a work area for the control unit 101.

An operation unit 105 is used to receive, from the user, an instruction which the user has issued to the image capturing apparatus 100. The operation unit 105 includes, for example, a power button, which is used for the user to issue an instruction for powering-on and powering-off of the image capturing apparatus 100, a release switch, which is used for the user to issue an instruction for starting and stopping of image capturing, a playback button, which is used for the user to issue an instruction for playing back moving image data. Additionally, the operation unit 105 includes an operation button such as a dedicated connection button for starting communication with an external apparatus via a communication unit 111 described below. Moreover, a touch panel formed on the display unit 106 described below is also included in the operation unit 105.

The display unit 106 performs, for example, displaying of a viewfinder image during image capturing, displaying of captured moving image data, and displaying of characters for dialogical operation. Furthermore, the display unit 106 does not necessarily need to be built in the image capturing apparatus 100. The image capturing apparatus 100 only needs to be able to connect to an internal or external display unit 106 and include at least a display control function for controlling a displaying operation of the display unit 106.

An audio input unit 107 is a device for inputting audio information, and audio data obtained by the audio input unit 107 converting the audio information is then recorded on the recording medium 110 in the audio file format.

The recording medium 110 is available to record moving image data output from the image capturing unit 102 and audio data output from the audio input unit 107. The recording medium 110 in the first exemplary embodiment is equipped with two slots. When the control unit 101 performs an arithmetic operation on moving image data obtained by the image capturing unit 102, the control unit 101 records a moving image file with a high resolution designated by the user (hereinafter referred to as a "main moving image file"), such as the resolution of an image sensor (not illustrated) of the image capturing unit 102, in the first slot of the recording medium 110. Additionally, the control unit 101 is able to generate a moving image file with a low resolution or low bit rate (hereinafter referred to as a "proxy moving image file"), which is to be transmitted from the communication unit 111 described below to the communication apparatus 200 via a network, and record the proxy moving image file in the second slot of the recording medium 110. Additionally, the recording medium 110 has the template of a metadata file recorded thereon. The control unit 101 is able to, in response to moving image data being recorded on the recording medium 110, generate a new metadata file, which is obtained by adding information such as the recording time of a moving image file to the template of a metadata file, and record the new metadata file on the recording medium 110. At this time, it is desirable that the moving image file and the new metadata file be able to be associated with each other by making the file name of the moving image file and the file name of the new metadata file the same. The recording medium 110 can be configured to be attachable to and detachable from the image capturing apparatus 100, or can be built in the image capturing apparatus 100. Thus, the image capturing apparatus 100 only needs to include at least a method for accessing the recording medium 110.

The communication unit 111 is an interface for connecting to an external apparatus. The image capturing apparatus 100 in the first exemplary embodiment is able to perform exchange of data with the external apparatus via the communication unit 111. For example, the image capturing apparatus 100 is able to transmit moving image data generated by the image capturing unit 102 or audio data generated by the audio input unit 107 to the external apparatus via the communication unit 111. Furthermore, in the first exemplary embodiment, the communication unit 111 includes an interface for communicating with an external apparatus via what is called a wireless local area network (LAN) conforming to the standard of IEEE 802.11. Moreover, the communication unit 111 also includes a Universal Serial Bus (USB) interface for communicating with an external apparatus via a USB cable. The control unit 101 implements wireless communication and wired communication with an external apparatus by controlling the communication unit 111.

Furthermore, the communication unit 111 of the image capturing apparatus 100 in the first exemplary embodiment includes an access point mode (hereinafter referred to as an "AP mode"), in which the communication unit 111 operates as an access point in the infrastructure mode. Additionally, the communication unit 111 includes a client mode (hereinafter referred to as a "CL mode"), in which the communication unit 111 operates as a client in the infrastructure mode. Then, by causing the communication unit 111 to operate in the CL mode, the image capturing apparatus 100 in the first exemplary embodiment is able to operate as a CL apparatus in the infrastructure mode. In the case of operating as a CL apparatus, the image capturing apparatus 100 is able to connect to a nearby AP apparatus to participate in a network which the AP apparatus forms. Moreover, by causing the communication unit 111 to operate in the AP mode, the image capturing apparatus 100 in the first exemplary embodiment is also able to operate as a simplified AP (hereinafter referred to as a "simple AP"), which is a type of AP but the function of which is more limited.

In response to the image capturing apparatus 100 operating as a simple AP, the image capturing apparatus 100 forms a network by itself. An apparatus located near the image capturing apparatus 100 recognizes the image capturing apparatus 100 as an AP apparatus, thus becoming able to participate in a network which is formed by the image capturing apparatus 100. It is assumed that a program for causing the image capturing apparatus 100 to operate in the above-described way is preliminarily retained in the non-volatile memory 103.

Furthermore, the image capturing apparatus 100 in the first exemplary embodiment is a simple AP which is a type of AP but which does not have a gateway function for transferring data received from a CL apparatus to, for example, an Internet provider. Accordingly, even when having received data from another apparatus which is participating in a network which the image capturing apparatus 100 has formed, the image capturing apparatus 100 is unable to transfer the received data to a network such as the Internet.

Figure 2B:
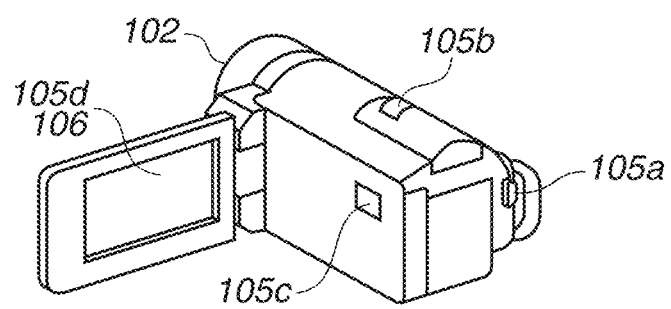
FIG. 2B is a perspective view illustrating an outer appearance of the image capturing apparatus.

Next, an outer appearance of the image capturing apparatus 100 is described. FIG. 2B is a diagram illustrating an example of an outer appearance of the image capturing apparatus 100. A release switch 105a, a zoom lever 105b, a playback button 105c, and a touch panel 105d are operation members which are included in the above-mentioned operation unit 105. Moreover, a moving image obtained as a result of image capturing by the image capturing unit 102 is displayed on the display unit 106.

Thus far is the description of the image capturing apparatus 100.

<Hardware Configuration of Communication Apparatus 200>

Figure 3:
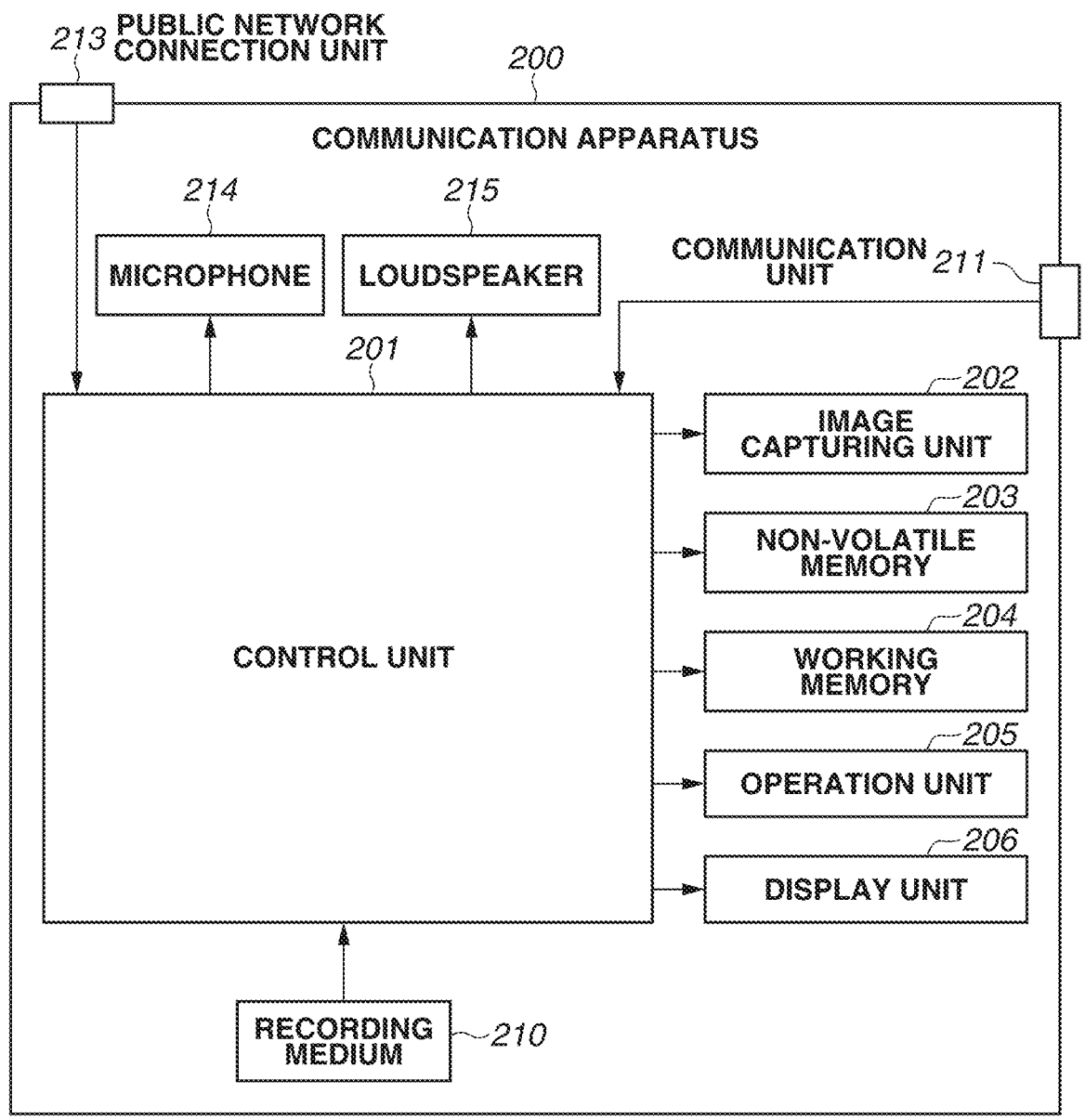
FIG. 3 is a block diagram illustrating a configuration of a communication apparatus in the first exemplary embodiment.

FIG. 3 is a block diagram illustrating a hardware configuration example of the communication apparatus 200 in the first exemplary embodiment.

Furthermore, while, here, a portable mobile terminal is described as an example of the communication apparatus 200, the communication apparatus 200 is not limited to this. For example, the communication apparatus 200 can be a digital video camera, tablet device, or personal computer having a wireless function.

A control unit 201 controls each unit of the communication apparatus 200 according to an input signal or a program described below. Furthermore, instead of the control unit 201 controlling the entire communication apparatus 200, a plurality of hardware pieces can be configured to share the processing to control the entire communication apparatus 200.

An image capturing unit 202 converts subject light formed as an image by a lens unit included in the image capturing unit 202 into an electrical signal, performs, for example, noise reduction processing on the electrical signal, and outputs the thus-obtained digital data as moving image data. The moving image data obtained by image capturing is temporarily stored in a buffer memory, is subjected to a predetermined arithmetic operation by the control unit 201, and is then recorded on a recording medium 210.

A non-volatile memory 203 is an electrically erasable and recordable non-volatile memory. On the non-volatile memory 203, an operating system (OS) serving as basic software which the control unit 201 executes and an application which implements an applicative function in cooperation with the OS are preliminarily recorded.

Moreover, in the first exemplary embodiment, in the non-volatile memory 203, a transfer application for communicating with the image capturing apparatus 100 and the server 300 is preliminarily stored.

Moreover, in the non-volatile memory 203, a file management application, which manages a moving image file and an audio file output from the image capturing apparatus 100, and an image management application are preliminarily stored.

A working memory 204 is used as, for example, a memory for image displaying on a display unit 206 and a work area for the control unit 201. In the first exemplary embodiment, in the case of transferring a moving image file and a metadata file received from the image capturing apparatus 100 to the server 300, the working memory 204 temporarily stores the received moving image file and metadata file.

An operation unit 205 is used to receive, from the user, an instruction which the user has issued to the communication apparatus 200. The operation unit 205 includes operation members such as a power button, which is used for the user to issue an instruction for powering-on and powering-off of the communication apparatus 200, and a touch panel formed on the display unit 206.

The display unit 206 performs, for example, displaying of moving image data and displaying of characters for dialogical operation. Furthermore, the display unit 206 does not necessarily need to be built in the communication apparatus 200. The communication apparatus 200 only needs to be able to connect to the display unit 206 and include at least a display control function for controlling a displaying operation of the display unit 206.

The recording medium 210 is available to record image data output from the image capturing unit 202.

The recording medium 210 can be configured to be attachable to and detachable from the communication apparatus 200, or can be built in the communication apparatus 200. Thus, the communication apparatus 200 only needs to include at least a method for accessing the recording medium 210.

A communication unit 211 is an interface for connecting to an external apparatus. The communication apparatus 200 in the first exemplary embodiment is able to perform exchange of data with the image capturing apparatus 100 and the server 300 via the communication unit 211. In the first exemplary embodiment, the communication unit 211 is an antenna, and the control unit 201 is able to connect to the image capturing apparatus 100 via the antenna. Furthermore, the communication apparatus 200 can be connected to each of the image capturing apparatus 100 and the server 300 via direct connection or via an access point. An example of a protocol to be used for communicating data is Picture Transfer Protocol over Internet Protocol (PTP/IP) using a wireless LAN.

Moreover, the communication unit 211 also includes a Universal Serial Bus (USB) interface for communicating with an external apparatus via a USB cable. Furthermore, the communication method for communication with an external apparatus is not limited to this. For example, the communication unit 211 can include a wireless communication module such as a Bluetooth® communication module or Wireless USB.

A public network connection unit 213 is an interface for use in performing public wireless communication.

The communication apparatus 200 is able to perform telephone call with another apparatus via the public network connection unit 213. At this time, the control unit 201 performs inputting and outputting of an audio signal via a microphone 214 and a loudspeaker 215, thus implementing telephone call.

The communication apparatus 200 in the first exemplary embodiment is also able to perform exchange of data with the server 300 via the public network connection unit 213. The public network connection unit 213 is antenna, and the control unit 201 is able to connect to a public network via the antenna. Furthermore, one antenna can be used both as the communication unit 211 and the public network connection unit 213. Moreover, generally, a communication using the communication unit 211 is higher in communication speed than a communication using a public network. Therefore, in the communication apparatus 200 in the first exemplary embodiment, when telephone call is not being performed, a communication using the communication unit 211 is prioritized.

Thus far is the description of the communication apparatus 200.

<Explanation of Chunk Recording File>

Next, two methods in which the image capturing apparatus 100 in the first exemplary embodiment records a moving image file with a low resolution or low bit rate of the MP4 file format on the recording medium 110 are explained with reference to FIGS. 4A and 4B. Each of the two methods is performed in parallel with recording of the main moving image file.

In response to the user pressing the release switch 105a of the image capturing apparatus 100, the image capturing apparatus 100 starts image recording, and, in response to the user pressing the release switch 105a again, the image capturing apparatus 100 ends image recording.

The first method includes proxy recording, which records a proxy moving image file while keeping a recording time thereof as that of a main moving image file. A proxy moving image file 401 has a recording time from image recording start to image recording end. Thus, the proxy recording is a recording method which generates one proxy moving image file with a recording time from image recording start to image recording end. At this time, a metadata file 402 is generated in parallel with the proxy moving image file 401 being generated at the timing of image recording end.

In the first exemplary embodiment, for example, the file name of the proxy moving image file 401 is configured with the fourth character "P" following the characters "MVI", followed by a file number and an extension. For example, the file name is expressed as "MVIP0001.MP4". In this way, the last character of a character string excluding a file number and an extension, in other words, a character immediately before the file number, enables recognizing that the moving image file concerned is a proxy moving image file, which is recorded by proxy recording. Moreover, the file name of the metadata file 402 is in common with that of the proxy moving image file 401 except for an extension and is thus expressed as "MVIP0001.XML". The character string "MVI" is merely an example and is not limited to three characters.

Next, the second method includes chunk recording, which, during recording of a moving image, generates proxy moving image files obtained by dividing the moving image in a small fashion at each timing when a predetermined time has elapsed and progressively records the generated proxy moving image files. In the first exemplary embodiment, every one of proxy moving image files obtained by division in the case of chunk recording is referred to as a "divided moving image file" or "chunk moving image file". For example, when 30 seconds has elapsed from the timing of image recording start or from the timing when a preceding chunk moving image file has been generated, the image capturing apparatus 100 generates a chunk moving image file. Specifically, when 30 seconds has elapsed from the timing of image recording start, the control unit 101 generates a chunk moving image file 403a and also generates a metadata file 404. While, in proxy recording, at the time of generation of a moving image file, the control unit 101 appends a recording time of the moving image file to a metadata file, in chunk recording, in a case where recording of a moving image is in progress, the control unit 101 does not need to append a recording time to a metadata file. Even after the chunk moving image file 403a is generated, recording of a moving image is continued, and, when 30 seconds has elapsed from the timing of generation of the chunk moving image file 403a, the control unit 101 generates a chunk moving image file 403b. In the case of the example illustrated in FIG. 4A, the control unit 101 records chunk moving image files at intervals of 30 seconds until the chunk moving image file 403b. In response to the user pressing the release switch 105a to issue an instruction for image recording end, the control unit 101 generates a chunk moving image file 403c corresponding to the time from the timing when the preceding chunk moving image file 403b has been generated to the timing when an instruction for image recording end has been received. At this time, the control unit 101 updates the metadata file 404 in such a way as to append, for example, a recording time from the timing of image recording start to the timing of image recording end to the metadata file 404. In the first exemplary embodiment, in this way, even in the case of chunk recording, one metadata file is assumed to be allocated to a group of chunk moving image files corresponding to the time from the timing of image recording start to the timing of image recording end.

In the first exemplary embodiment, for example, a file name for use in the case of chunk recording is defined as follows. The file name of the chunk moving image file 403*a*, which is first generated, is configured with the fourth character "B" following characters "MVI" so as to enable recognizing that the moving image file concerned is a moving image file at the starting point (the time of image recording start), and is thus expressed as "MVIB0001.MP4". The file name of the chunk moving image file 403*b*, which is next generated, is configured with the fourth character "D" following characters "MVI" so as to enable recognizing that the moving image file concerned is a moving image file at the middle point, and is thus expressed as "MVID0002.MP4". The file name of the chunk moving image file 403*c*, which is last generated, is configured with the fourth character "E" following characters "MVI" so as to enable recognizing that the moving image file concerned is a moving image file at the ending point (the time of image recording end), and is thus expressed as "MVIE0003.MP4".

Moreover, the file name of the metadata file 404 is in common with that of the proxy moving image file 403*a* except for an extension and is thus expressed as "MVIB0001.XML".

In the first exemplary embodiment, the above-mentioned naming rule, which allocates the fourth character of the file name, being employed is used to perform determination as to whether moving image recording is proxy recording or chunk recording described below. Moreover, setting the fourth character of the file name of a chunk moving image file which is generated at the time of image recording end in chunk recording to "E" is used to perform determination as to whether the moving image file is a moving image file at the ending point. In this way, the last character of a character string of the file name, in other words, a character immediately before the file number, enables recognizing that the moving image file concerned is a chunk moving image file, which is recorded by chunk recording, and also enables recognizing whether the chunk moving image file concerned is a moving image at the starting point in a series of moving images obtained by division, a moving image at the middle point therein, or a moving image at the ending point therein.

Next, an advantageous effect which is brought about by performing chunk recording, serving as the second method, in the case of transfer from the image capturing apparatus 100 to the server 300 via the communication apparatus 200 is described with reference to FIG. 4B.

With regard to a moving image file in the case of proxy recording, since it is impossible to perform file transmission when the moving image file is in the process of being recorded, a transmission time of the proxy moving image file 401 is also required in addition to a recording time of the proxy moving image file 401.

In FIG. 4B, an up down arrow 405 indicates a time required from the starting of proxy recording to the completion of transfer of the proxy moving image file 401.

With regard to a moving image file in the case of chunk recording, it is possible to sequentially transmit chunk moving image files generated when the moving image file is in the process of being recorded. For example, if the chunk moving image file 403*a* has been generated, it is possible to transfer the chunk moving image file 403*a* even when the image capturing apparatus 100 is in the process of performing recording. Referring to FIG. 4B, it is possible to start transfer earlier by a difference time 406 with respect to a recording time of the proxy moving image file 401. An up down arrow 407 indicates a time required from the image recording start of a moving image file in chunk recording to the completion of transmission of the moving image file. In this way, there is an advantage in which a transfer time 407 in chunk recording is shorter for completion by a difference time 408 than the transfer time 405 in proxy recording.

Furthermore, while, in the above-described explanation, 30 seconds is mentioned as an example, the first exemplary embodiment is not limited to this. A longer time can be employed in a case where the communication speed is sufficiently high. Moreover, to enable changing the required time according to the performance of a communication line to be used, a configuration in which the user is allowed to set an optional time by a menu operation can be employed.

Moreover, division of a moving image file may occur even in recording of a main moving image. For example, in a case where the file system is File Allocation Table 32 (FAT32), the upper limit of a file size which the system is able to recognize is defined as 4 giga bytes (GB). Therefore, even when a main moving image file is in the process of being recorded, division can be performed before the file size exceeds 4 GB and recording can be continued with new moving image files being generated. Thus, division of a moving image by chunk recording can be simultaneously mounted in one apparatus as a function different from division that is based on the upper limit of a file size which the file system is able to recognize.

Furthermore, in the case of such division that is based on the upper limit of a file size which the file system is able to recognize, unlike a generation rule for file name in division of a moving image by chunk recording, a file name is generated according to the same generation rule as that employed when a new moving image file is generated. Thus, the character string "MVI", which indicates that the image file concerned is a moving image file, is similarly used and is followed by a number which is sequentially incremented for the sake of distinction.

<Description of Screens>

Figure 5A:
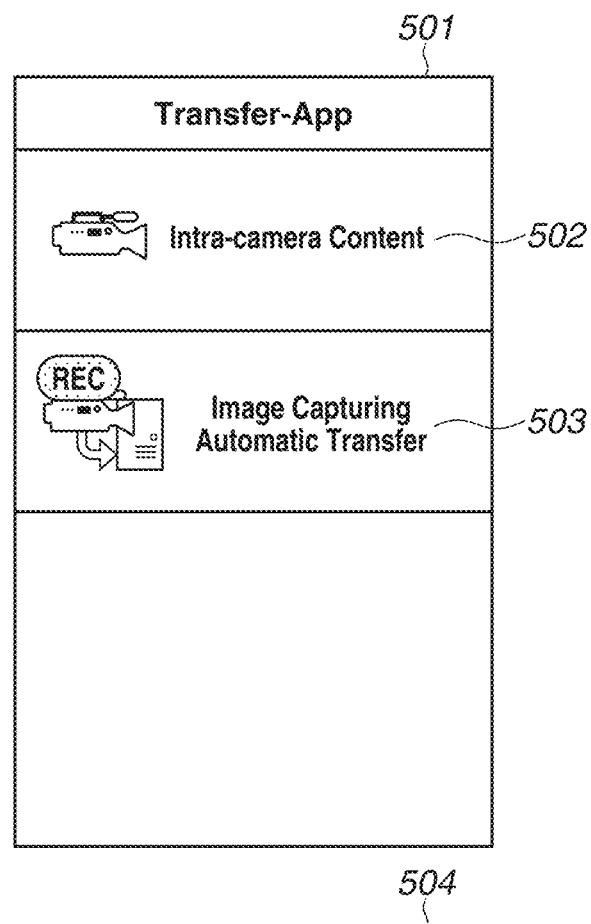
FIGS. 5A and 5B are diagrams illustrating examples of screens of a transfer application, which is controlled in the communication apparatus in the first exemplary embodiment.
Figure 5B:
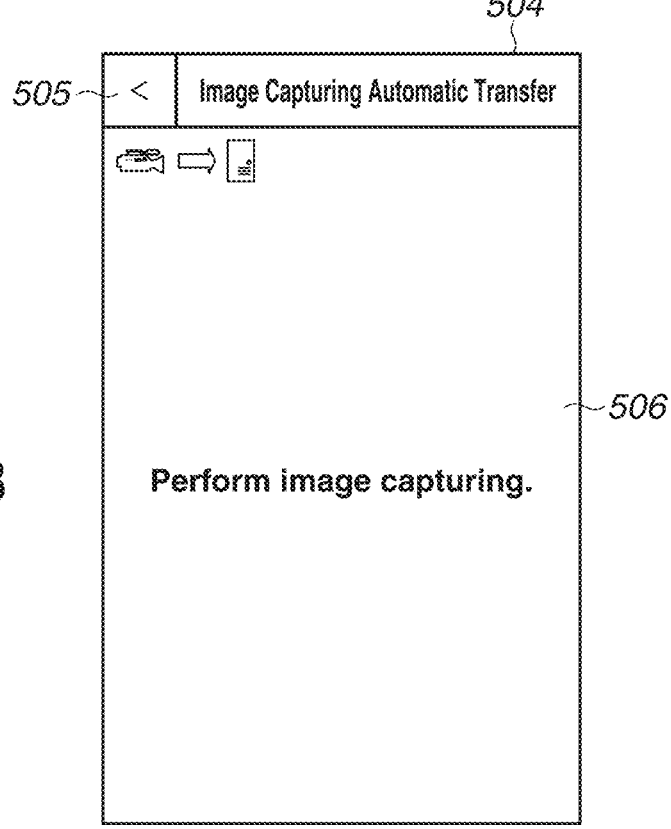

Next, aspects of the transfer application in the first exemplary embodiment are described with reference to FIGS. 5A and 5B. FIGS. 5A and 5B are schematic diagrams each illustrating a display state and a function of an operation screen of the transfer application.

Referring to FIG. 5A, a function selection screen 501 is a screen which is displayed in a state in which, after being activated, the transfer application is connected to the image capturing apparatus 100. The function selection screen 501 includes an intra-camera content list display button 502, which is used to select the function of displaying files recorded in the image capturing apparatus 100. Additionally, the function selection screen 501 includes an automatic transfer button 503, which is used to select the function of, after the image capturing apparatus 100 starts recording and generates a file, automatically transferring the generated file to the server 300 via the communication apparatus 200. In response to the intra-camera content list display button 502 being pressed, the function selection screen 501 transitions to a transfer selection screen, and, in response to the automatic transfer button 503 being pressed, the function selection screen 501 transitions to an automatic transfer screen.

Referring to FIG. 5B, the automatic transfer screen 504 is a screen which is used to display files transferred from the image capturing apparatus 100 to the server 300, to which the function selection screen 501 transitions in response to the automatic transfer button 503 displayed therein being pressed.

A button 505 is used to return the automatic transfer screen 504 to the previous screen. A screen 506 is an initial screen for the automatic transfer screen 504, and is being displayed during a period in which any file is not yet transferred.

As mentioned above, a main purpose of the transfer application in the first exemplary embodiment is to, with use of the above-mentioned function, automatically transfer a moving image file and a metadata file recorded by the image capturing apparatus 100 to the server 300 via the communication apparatus 200. Particularly, the main purpose is to, with regard to automatic transfer in a case where the recording method of the image capturing apparatus 100 is chunk recording, optimize an automatic transfer sequence and prevent an unnecessary metadata file from being communicated. The automatic transfer function in the image capturing apparatus and the transfer application in the first exemplary embodiment treats transmission and reception of a proxy moving image file and does not perform transmission and reception of a main moving image file. This is because the main moving image file is large in data size and is time-consuming until the completion of communication. Furthermore, the first exemplary embodiment is not limited to this. A configuration in which, in the case of using a line sufficiently high in communication speed, the automatic transfer function is able to perform transmission and reception of a main moving image file can be employed.

<Processing Sequence Between Image Capturing Apparatus 100, Communication Apparatus 200, and Server 300>

Next, processing for the automatic transfer function of the transfer application of the communication apparatus 200 is described with reference to FIGS. 6A and 6B and FIG. 7.

Figure 6B:
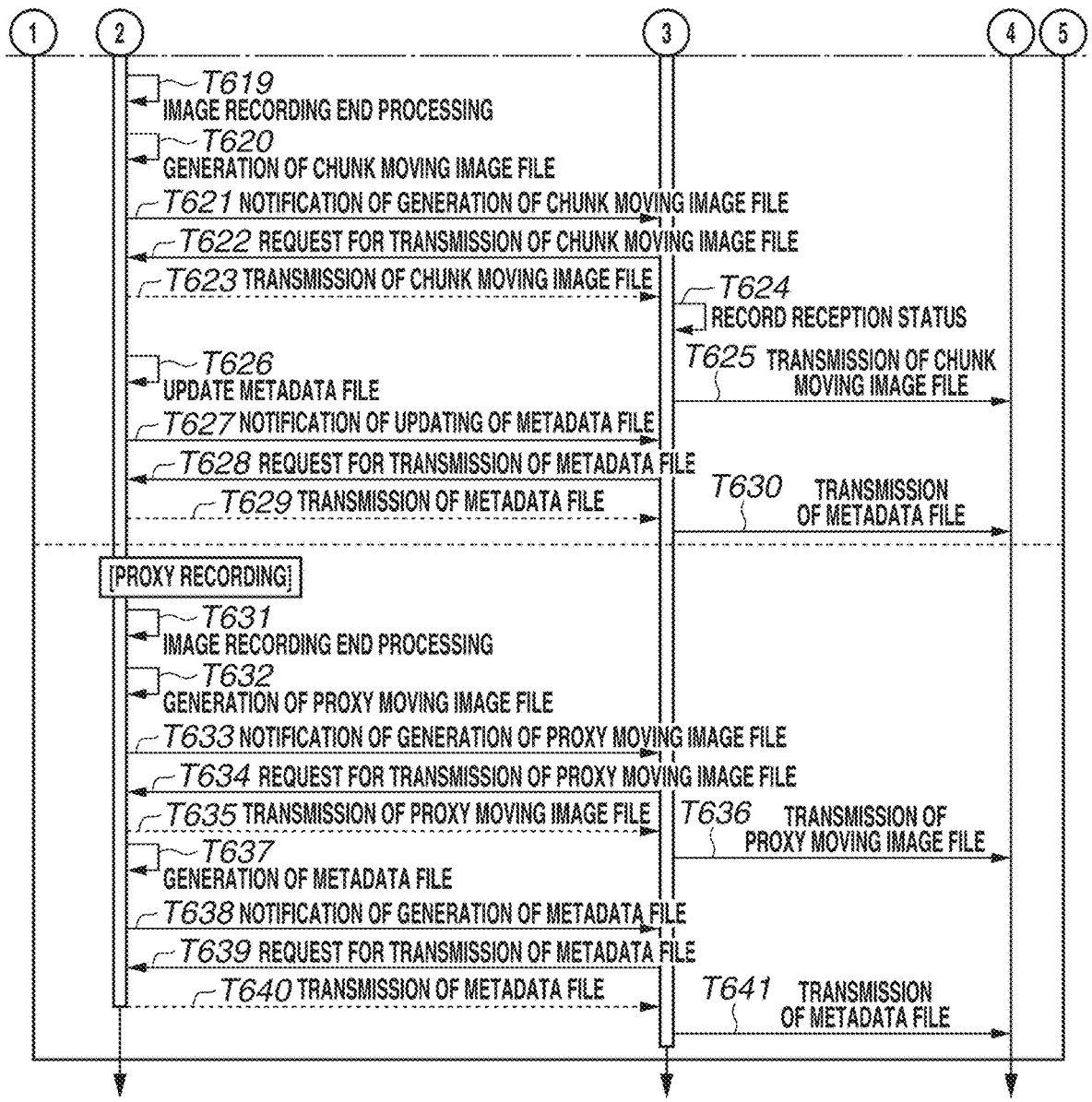

FIGS. 6A and 6B are diagrams illustrating a procedure which is performed in transferring moving image files and metadata files between the image capturing apparatus 100, the communication apparatus 200, and the server 300. This procedure is started in parallel with the screen 504 being displayed in response to detection of the automatic transfer button 503 being tapped by the user in the function selection screen 501 illustrated in FIG. 5A.

First, in step T601 illustrated in FIG. 6A, the communication apparatus 200 instructs the image capturing apparatus 100 to send a notification to the communication apparatus 200 when the image capturing apparatus 100 has performed each of generation of a moving image file, generation of a metadata file, and updating of a metadata file. While generation of a metadata file and updating of a metadata file may not be performed depending on recording processing to be performed, since, at this point of time, what recording processing is to be performed later in the image capturing apparatus 100 is unknown, the communication apparatus 200 instructs the image capturing apparatus 100 to send a notification with respect to both generation of a metadata file and updating of a metadata file.

In step T602 illustrated in FIG. 6A, in response to the user pressing the release switch 105a of the image capturing apparatus 100, the image capturing apparatus 100 starts recording of a moving image file. At this time, depending on to which of proxy recording and chunk recording the user has set the recording method of the image capturing apparatus 100 by operating the operation unit 105 of the image capturing apparatus 100, processing which the control unit 101 of the image capturing apparatus 100 performs branches.

First, a case where the recording method of the image capturing apparatus 100 has been set to chunk recording is described. In this case, in step T603 illustrated in FIG. 6A, the image capturing apparatus 100 continues recording for a predetermined time. When the predetermined time has elapsed, then in step T604 illustrated in FIG. 6A, the image capturing apparatus 100 generates a chunk moving image file.

After the chunk moving image file is generated in step T604, then in step T605 illustrated in FIG. 6A, the image capturing apparatus 100 transmits a notification of generation of the chunk moving image file to the communication apparatus 200 via the communication unit 111.

Upon receiving the notification of generation of the chunk moving image file in step T605, then in step T606 illustrated in FIG. 6A, the communication apparatus 200 transmits, to the image capturing apparatus 100 via the communication unit 211, a chunk moving image file transmission request for requesting the image capturing apparatus 100 to transmit the chunk moving image file to the communication apparatus 200.

Upon receiving the chunk moving image file transmission request from the communication apparatus 200 in step T606, then in step T607 illustrated in FIG. 6A, the image capturing apparatus 100 transmits the chunk moving image file to the communication apparatus 200 via the communication unit 111.

Upon the completion of reception of the chunk moving image file from the image capturing apparatus 100 in step T607, then in step T608 illustrated in FIG. 6A, the communication apparatus 200 records a reception status on the working memory 204. The reception status is, for example, the file name of the received chunk moving image file. Details of the reception status are described below.

In step T609 illustrated in FIG. 6A, the communication apparatus 200 starts transferring the chunk moving image file received in step T607 to the server 300 via the communication unit 211. Subsequent processing operations are performed in parallel with transfer of the chunk moving image file to the server 300 performed in step T609 except for transfer of a further chunk moving image file to the server 300. For example, transfer of the chunk moving image file to the server 300 performed in step T609 is performed in parallel with processing operations in step T612 to step T617.

After generating the chunk moving image file in step T604, then in step T610 illustrated in FIG. 6A, the image capturing apparatus 100 generates a metadata file associated with a moving image which is in the process of being recorded, by reference to templates for metadata files currently recorded on the recording medium 110.

After the completion of generation of the metadata file in step T610, then in step T611 illustrated in FIG. 6A, the image capturing apparatus 100 transmits a notification of generation of the metadata file to the communication apparatus 200 via the communication unit 111. In a case where the recording method of the image capturing apparatus 100 is chunk recording, even when receiving a notification of generation of a metadata file, the communication apparatus 200 does not request the generated metadata file from the image capturing apparatus 100.

Furthermore, while the communication apparatus 200 does not request a generated metadata file, this notification enables the communication apparatus 200 to recognize that the chunk moving image file received in step T607 is a chunk moving image file with which a metadata file is associated.

Moreover, while, here, for the sake of expedience, a case where the timing of generation of a metadata file is timing of step T610 has been described as an example, the timing of generation of a metadata file is not limited to this. As long as at least after a chunk moving image file is generated in step T604, a metadata file can be generated at any timing.

Next, in step T612, the image capturing apparatus 100 continues moving image recording until a predetermined time elapses from the timing of generation of the chunk moving image file in step T604. Thus, processing operations in step T605 to step T611 are performed in parallel with moving image recording which is continued from the completion in step T604.

Processing operations in step T613 to step T618 illustrated in FIG. 6A are equivalent to the processing operations in step T604 to step T609 and are, therefore, omitted from description. Step T612 to step T618 are subjected to loop processing until the user presses the release switch 105a of the image capturing apparatus 100. As a result, the recording itself of a moving image is continued until the loop is ended, and, while, normally, one moving image file is transmitted as a whole, moving image files obtained by dividing the moving image as chunk moving images are sequentially transmitted from the image capturing apparatus 100 to the communication apparatus 200. Furthermore, in the first exemplary embodiment, during this processing operation, the generation of a metadata file as in step T610 is not performed. Moreover, updating of a metadata file is also not performed. Moreover, a case where, depending on the condition of a line for use in transfer to the server 300, the transmission in step T609 is not yet completed at the time point of step T617 is supposed. Moreover, a case where, at the time point of step T617 which is repeatedly performed in a looped manner, the transmission in step T618 in the previous loop is not yet completed is also supposed. In such cases, chunk moving image files are brought into the state of being reserved for being transmitted and thus become sequentially transmitted.

In response to the user pressing the release switch 105a of the image capturing apparatus 100, the loop processing is ended, and the image capturing apparatus 100 performs image recording end processing in step T619 illustrated in FIG. 6B.

After performing the image recording end processing in step T619, then in step T620 illustrated in FIG. 6B, the image capturing apparatus 100 generates the last chunk moving image file. Processing operations in step T621 to step T625 are equivalent to the processing operations in step T605 to step T609 and are, therefore, omitted from description.

After generating the chunk moving image file in step T620, then in step T626 illustrated in FIG. 6B, the control unit 101 of the image capturing apparatus 100 appends, for example, a recording time taken from the timing of step T602 to the timing of step T619 to the metadata file generated in step T610, thus updating the metadata file.

After updating the metadata file in step T626, then in step T627 illustrated in FIG. 6B, the control unit 101 of the image capturing apparatus 100 transmits a notification of updating of the metadata file to the communication apparatus 200 via the communication unit 111.

Upon receiving the notification of updating of the metadata file from the image capturing apparatus 100 in step T627, then in step T628 illustrated in FIG. 6B, the control unit 201 of the communication apparatus 200 transmits, to the image capturing apparatus 100 via the communication unit 211, a request for transmission of the metadata file to the communication apparatus 200.

Upon receiving the request for transmission of the metadata file from the communication apparatus 200 in step T628, then in step T629 illustrated in FIG. 6B, the control unit 101 of the image capturing apparatus 100 transmits the metadata file to the communication apparatus 200 via the communication unit 111.

Upon receiving the metadata file from the image capturing apparatus 100 in step T629, then in step T630 illustrated in FIG. 6B, the control unit 201 of the communication apparatus 200 transmits the received metadata file to the server 300 via the communication unit 211.

Next, a sequence which is performed in a case where the recording method of the image capturing apparatus 100 is proxy recording is described.

In this case, the moving image recording which has been started in step T602 is continued until the release switch 105a is pressed by the user. In response to the user pressing the release switch 105a of the image capturing apparatus 100, then in step T631 illustrated in FIG. 6B, the image capturing apparatus 100 performs image recording end processing.

After performing the image recording end processing in step T631, then in step T632 illustrated in FIG. 6B, the image capturing apparatus 100 generates one proxy moving image file.

After generating the proxy moving image file in step T632, then in step T633 illustrated in FIG. 6B, the image capturing apparatus 100 transmits a notification of generation of the proxy moving image file to the communication apparatus 200 via the communication unit 111.

Upon receiving the notification of generation of the proxy moving image file in step T633, then in step T634 illustrated in FIG. 6B, the communication apparatus 200 transmits, to the image capturing apparatus 100 via the communication unit 211, a request for transmission of the proxy moving image file to the communication apparatus 200.

Upon receiving the request for transmission of the proxy moving image file from the communication apparatus 200 in step T634, then in step T635 illustrated in FIG. 6B, the image capturing apparatus 100 transmits the proxy moving image file to the communication apparatus 200 via the communication unit 111.

Upon the completion of reception of the proxy moving image file from the image capturing apparatus 100 in step T635, then in step T636 illustrated in FIG. 6B, the communication apparatus 200 transfers the proxy moving image file received in step T635 to the server 300 via the communication unit 211.

After generating the proxy moving image file in step T632, then in step T637 illustrated in FIG. 6B, the image capturing apparatus 100 generates a metadata file associated with a moving image which is in the process of being recorded, by reference to templates for metadata files currently recorded on the recording medium 110. At this time, the image capturing apparatus 100 generates a metadata file with, for example, a recording time taken from the timing of step T602 to the timing of step T631 appended thereto.

After generating the metadata file in step T637, then in step T638 illustrated in FIG. 6B, the control unit 101 of the image capturing apparatus 100 transmits a notification of generation of the metadata file to the communication apparatus 200 via the communication unit 111.

Upon receiving the notification of generation of the metadata file from the image capturing apparatus 100 in step T638, then in step T639 illustrated in FIG. 6B, the control unit 201 of the communication apparatus 200 transmits, to the image capturing apparatus 100 via the communication unit 211, a request for transmission of the metadata file to the communication apparatus 200.

Upon receiving the request for transmission of the metadata file from the communication apparatus 200 in step T639, then in step T640 illustrated in FIG. 6B, the control unit 101 of the image capturing apparatus 100 transmits the metadata file to the communication apparatus 200 via the communication unit 111.

Upon receiving the metadata file from the image capturing apparatus 100 in step T640, then in step T641 illustrated in FIG. 6B, the control unit 201 of the communication apparatus 200 transmits the received metadata file to the server 300 via the communication unit 211.

Thus far is the description of a procedure in which, after the transfer application of the communication apparatus 200 transitions to the automatic transfer screen 504 and starts waiting for reception of automatic transfer, the communication apparatus 200 transfers a moving image file and a metadata file generated by the image capturing apparatus 100 to the server 300.

<Processing Flow by Communication Apparatus 200>

Next, a processing flow by the communication apparatus 200 for transferring a moving image file and a metadata file generated by the image capturing apparatus 100 to the server 300 is described with reference to FIG. 7.

Figure 7:
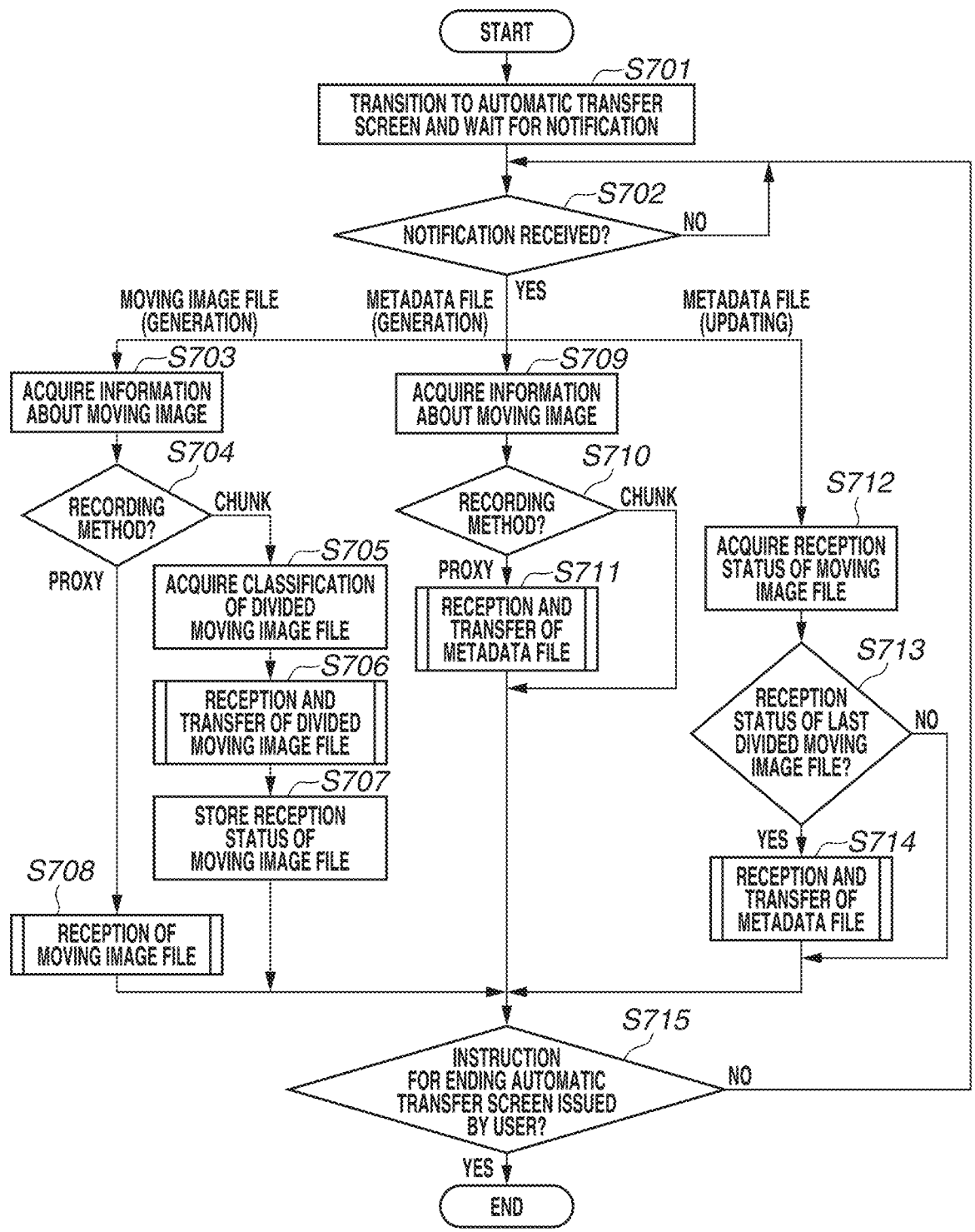
FIG. 7 is a flowchart of processing which the communication apparatus performs in transfer of chunk recording files and metadata files by the communication apparatus in the first exemplary embodiment.

The processing flow illustrated in FIG. 7 is processing which is performed in response to, as a trigger, tapping on the button 503 being detected by the operation unit 205 during displaying of the screen 501 illustrated in FIG. 5A.

In step S701 illustrated in FIG. 7, the control unit 201 of the communication apparatus 200 causes screen displaying of the transfer application to transition to the automatic transfer screen 504. Moreover, the control unit 201 of the communication apparatus 200 transmits a request for notification of image recording for step T601 to the image capturing apparatus 100 via the communication unit 211, in such a way as to cause the image capturing apparatus 100 to, after the image capturing apparatus 100 starts image recording, transmit a notification of generation of a moving image file, a notification of generation of a metadata file, and a notification of updating of a metadata file. At this time, the control unit 201 of the communication apparatus 200 is brought into the state of waiting for a notification transmitted from the image capturing apparatus 100 via the communication unit 211.

In step S702, the control unit 201 of the communication apparatus 200 determines whether a notification has been received from the image capturing apparatus 100 via the communication unit 211. If it is determined that no notification has been received (NO in step S702), the control unit 201 waits until receiving a notification. If it is determined that a notification has been received (YES in step S702), the control unit 201 branches the processing depending on the type of the received notification. The notification which the control unit 201 receives in the first exemplary embodiment includes three types, i.e., a notification of generation of a moving image file, a notification of generation of a metadata file, and a notification of updating of a metadata file, which are transmitted from the image capturing apparatus 100.

In the first exemplary embodiment, the control unit 201 receives these notifications with use of the PTP/IP protocol. In step S702, the control unit 201 analyzes the command type in the PTP/IP protocol to determine which notification has been received. Each of the notification of generation of a moving image file and the notification of generation of a metadata file is transmitted as an object addition notification event. Since a file name is stored as a parameter included in an event data set of this notification, the control unit 201 is able to determine that, if the file extension is MP4, the notification is the notification of generation of a moving image file and, if the file extension is XML, the notification is the notification of generation of a metadata file. The notification of updating of a metadata file is transmitted as an event name of an object updating notification event. Similarly, since a file name is stored in an event data set, the control unit 201 is able to determine that, if the file extension is XML, the notification is the notification of updating of a metadata file.

Furthermore, while, in the first exemplary embodiment, it has been described that a file name is stored in an event data set, the control unit 201 can be configured to, based on the notification, acquire information about a file recorded on the recording medium 110 from the image capturing apparatus 100 and thus acquire a file name.

If it is determined that a notification of generation of a moving image file has been received (MOVING IMAGE FILE (GENERATION) in step S702), the control unit 201 advances the processing to step S703. If it is determined that a notification of generation of a metadata file has been received (METADATA FILE (GENERATION) in step S702), the control unit 201 advances the processing to step S709. If it is determined that a notification of updating of a metadata file has been received (METADATA FILE (UPDATING) in step S702), the control unit 201 advances the processing to step S712.

First, a case where the control unit 201 of the communication apparatus 200 has received a notification of generation of a moving image file in step S702 is described.

In step S703 illustrated in FIG. 7, the control unit 201 of the communication apparatus 200 acquires information from an event data set included in the received notification of generation of a moving image file.

In step S704 illustrated in FIG. 7, the control unit 201 determines the recording method of the image capturing apparatus 100 from the information acquired in step S703. For example, in the first exemplary embodiment, the control unit 201 determines whether the recording method is chunk recording or proxy recording, based on a file name included in the event data set. As mentioned above with reference to FIG. 4A, in a case where the fourth character following "MVI" of the file name is "B", "D", or "E", the control unit 201 is able to determine that the recording method is chunk recording, and, in a case where the fourth character is "P", the control unit 201 is able to determine that the recording method is proxy recording. However, in a case where the timing when the user presses the release switch 105a to end recording is within a predetermined time required for generating the first chunk moving image file from the time of image recording start, the fourth character in the file name may become not "B" but "E", which indicates the end point. Moreover, in a case where recording is ended immediately after a moving image file at the start point is generated, the fourth character in the file name may become not "D", which indicates a moving image file at the middle point, but "E", which indicates the end point.

Furthermore, the method for determining the recording method of the image capturing apparatus 100 is not limited to a method of referring to a file name included in the parameters of an event data set included in the notification.

For example, the control unit 201 of the communication apparatus 200 can acquire a setting value of the recording method of the image capturing apparatus 100 via the communication unit 211 to determine the recording method. The timing of acquisition of a setting value of the recording method of the image capturing apparatus 100 includes, for example, timing at which the communication apparatus 200 has connected to the image capturing apparatus 100 and timing at which the screen displaying of the transfer application has transitioned to the automatic transfer screen 504 in step S701.

Moreover, if the header or footer of each chunk moving image file has file names of the preceding and subsequent chunk moving image files previously recorded therein, since the header or footer of a proxy moving image file has no such file names recorded therein, the control unit 201 becomes able to determine the recording method.

Moreover, a metadata file indicating configuring a chunk moving image file can be appended to each chunk moving image file to enable determining the recording method.

As long as it is possible to acquire the recording method of the image capturing apparatus 100 within the range of such a gist, any method can be employed.

If, in step S704, it is determined that the recording method is for generation of a chunk moving image from the notification of generation of a moving image file received from the image capturing apparatus 100 (CHUNK in step S704), the control unit 201 of the communication apparatus 200 advances the processing to step S705. If it is determined that the recording method is for generation of a proxy moving image (PROXY in step S704), the control unit 201 advances the processing to step S708.

In step S705, the control unit 201 of the communication apparatus 200 then stores, in the working memory 204, the classification of a chunk moving image file name included in an event data set of the notification of generation of a moving image file received in step S702. The classification of a chunk moving image file name represents the character following "MVI" being any one of "B" indicating the start point, "D" indicating the middle point, and "E" indicating the end point.

In step S706 illustrated in FIG. 7, the control unit 201 of the communication apparatus 200 performs reception of a chunk moving image file from the image capturing apparatus 100 and transfer of the chunk moving image file to the server 300. Specifically, first, the control unit 201 of the communication apparatus 200 transmits, to the image capturing apparatus 100 via the communication unit 211, a request for transmission of a chunk moving image file to the communication apparatus 200 in step T606, T615, or T622. For example, the control unit 201 transmits an operation for object acquisition in the PTP/IP protocol. Upon receiving the request for transmission of a chunk moving image file from the communication apparatus 200, the control unit 101 of the image capturing apparatus 100 transmits the chunk moving image file to the communication apparatus 200 in step T607, T616, or T623. The control unit 201 of the communication apparatus 200 receives the chunk moving image file from the image capturing apparatus 100 and then temporarily stores the received chunk moving image file in the working memory 204. Upon the completion of reception, the control unit 201 of the communication apparatus 200 transmits the chunk moving image file stored in the working memory 204 to the server 300 via the communication unit 211.

The display content of the automatic transfer screen 504 at this time is described with reference to FIG. 8A.

A status region 801 is used to indicate a chunk moving image file which is in the process of being received and transferred in step S706 and a status of the chunk moving image file. Below the status region 801, chunk moving image files which have already been transferred and a chunk moving image file which is in the process of being transferred are shown.

A character string 802 indicates the file name of a chunk moving image file.

A part 803 is used to display the thumbnail image of a chunk moving image file, thus displaying a thumbnail image recorded in a moving image file corresponding to the file name 802.

A character string 804 indicates the date and time of recording of the file.

An icon 805 indicates whether a metadata file for the chunk moving image file exists. The icon 805 is displayed in a case where a notification of generation of a metadata file described below has been received.

An icon 806 indicates that the moving image file has been recorded by chunk recording. The icon 806 is displayed based on the recording method which the control unit 201 of the communication apparatus 200 has determined in step S704.

A transfer completion icon 807 is displayed when processing for reception and transfer in step S705 has been completed.

A transfer-in-progress icon 808 is displayed when processing for reception and transfer in step S705 is in progress.

The description refers back to FIG. 7.

Upon the completion of reception of the chunk moving image file in step S706, then in step S707, the control unit 201 of the communication apparatus 200 stores a reception status of the moving image file. For example, if the classification acquired in step S705 is the end point, the control unit 201 stores, in the working memory 204, a flag indicating that the last chunk moving image file has been received and a file name of the chunk moving image file.

Upon the completion of transmission of the chunk moving image file to the server 300, the control unit 201 of the communication apparatus 200 advances the processing to step S715.

If, in step S704, it is determined that the recording method of the image capturing apparatus 100 is proxy recording (PROXY in step S704), then in step S708, the control unit 201 of the communication apparatus 200 receives a proxy moving image file from the image capturing apparatus 100 via the communication unit 211. Specifically, first, the control unit 201 of the communication apparatus 200 transmits, to the image capturing apparatus 100 via the communication unit 211, a request for transmission of a proxy moving image file to the communication apparatus 200 in step T634. For example, the control unit 201 transmits an operation for object acquisition in the PTP/IP protocol. Upon receiving the request for transmission of a proxy moving image file from the communication apparatus 200, the control unit 101 of the image capturing apparatus 100 transmits the proxy moving image file to the communication apparatus 200 in step T635. The control unit 201 of the communication apparatus 200 receives the proxy moving image file from the image capturing apparatus 100 and then temporarily stores the received proxy moving image file in the working memory 204. Upon the completion of reception, the control unit 201 of the communication apparatus 200 transmits the proxy moving image file stored in the working memory 204 to the server 300 via the communication unit 211.

Upon the completion of transmission of the proxy moving image file to the server 300, the control unit 201 of the communication apparatus 200 advances the processing to step S715.

Next, a case where the notification which the control unit 201 of the communication apparatus 200 has received in step S702 is a notification of generation of a metadata file is described.

In step S709, the control unit 201 of the communication apparatus 200 acquires information from an event data set included in the received notification of generation of a moving image file.

In step S710, the control unit 201 determines the recording method of the image capturing apparatus 100 from the information acquired in step S709. The method of determining whether the recording method is chunk recording or proxy recording is similar to that in step S704 and is, therefore, omitted from description. If, in step S710, it is determined that the recording method of the image capturing apparatus 100 is proxy recording (PROXY in step S710), then in step S711, the control unit 201 acquires metadata. On the other hand, if it is determined that the recording method of the image capturing apparatus 100 is chunk recording (CHUNK in step S710), the control unit 201 advances the processing to step S715 without via step S711. Thus, the control unit 201 advances the processing to step S715 without acquiring metadata.

In step S711, the control unit 201 of the communication apparatus 200 performs reception of a metadata file from the image capturing apparatus 100 and transfer of the metadata file to the server 300. Specifically, first, the control unit 201 of the communication apparatus 200 transmits, to the image capturing apparatus 100 via the communication unit 211, a request for transmission of a metadata file to the communication apparatus 200 in step T639. For example, the control unit 201 transmits an operation for object acquisition in the PTP/IP protocol. Upon receiving the request for transmission of a metadata file from the communication apparatus 200, the control unit 101 of the image capturing apparatus 100 transmits the metadata file to the communication apparatus 200 in step T640.

The control unit 201 of the communication apparatus 200 receives the metadata file from the image capturing apparatus 100 and then temporarily stores the received metadata file in the working memory 204. Upon the completion of reception, the control unit 201 of the communication apparatus 200 transmits the metadata file stored in the working memory 204 to the server 300 via the communication unit 211 as in step T641.

The display content of the automatic transfer screen 504 at this time is described with reference to FIG. 8B.

In the status region 801, an indication indicating that a metadata file for the proxy moving image file is in the process of being transferred is displayed. A file name 809 represents a proxy moving image file name corresponding to the metadata file which is in the process of being received and transferred in step S711. Since a proxy moving image file and a metadata file become one set, the transfer-in-progress icon 808 is displayed next to the file name 809 of the proxy moving image file.

Upon the completion of transmission of the metadata file to the server 300, the control unit 201 of the communication apparatus 200 advances the processing to step S715.

Next, a case where the notification which the control unit 201 of the communication apparatus 200 has received in step S702 is a notification of updating of a metadata file is described. Furthermore, the notification of updating of a metadata file is transmitted to the communication apparatus 200 via the communication unit 111 in step T627 when the control unit 101 of the image capturing apparatus 100 has updated a metadata file in step T626 in a case where the image capturing apparatus 100 is performing chunk recording.

In step S712 illustrated in FIG. 7, the control unit 201 of the communication apparatus 200 reads out the reception status stored in step S707 from the working memory 204.

If, in step S713 illustrated in FIG. 7, it is determined that the reception status read out in step S712 is a status indicating that the last chunk moving image file has been completely received (YES in step S713), the control unit 201 advances the processing to step S714. If it is determined that the reception status indicates that the last chunk moving image file has not yet been completely received (NO in step S713), the control unit 201 advances the processing to step S715.

In step S714 illustrated in FIG. 7, the control unit 201 of the communication apparatus 200 performs reception of the metadata file from the image capturing apparatus 100 and transfer of the received metadata file to the server 300. Specifically, first, the control unit 201 of the communication apparatus 200 transmits, to the image capturing apparatus 100 via the communication unit 211, a request for transmission of a metadata file to the communication apparatus 200 in step T628. For example, the control unit 201 transmits an operation for object acquisition in the PTP/IP protocol. Upon receiving the request for transmission of a metadata file from the communication apparatus 200, the control unit 101 of the image capturing apparatus 100 transmits the metadata file to the communication apparatus 200 in step T629. The control unit 201 of the communication apparatus 200 receives the metadata file from the image capturing apparatus 100 and then temporarily stores the received metadata file in the working memory 204. Upon the completion of reception, the control unit 201 of the communication apparatus 200 transmits the metadata file stored in the working memory 204 to the server 300 via the communication unit 211 as in step T630.

The display content of the automatic transfer screen 504 which is displayed after the reception and transfer of the metadata file have been completed in step S714 is described with reference to FIG. 8C.

In the status region 801, an indication indicating that the transfer of the updated metadata file has been completed is displayed, and, below the status region 801, chunk moving image files and metadata file which have been completely transferred are displayed. In the case of transfer of a metadata file, a thumbnail image to be displayed in the status region 801 is an image indicating that the metadata file concerned is a metadata file preliminarily stored in the non-volatile memory 203.

In the first exemplary embodiment, as a result of the sequence and flow illustrated in FIGS. 6A and 6B and FIG. 7 being performed, the chunk moving image files and metadata file which the image capturing apparatus 100 has recorded on the recording medium 110 become as shown in a directory entry illustrated in FIG. 8D.

The directory entry illustrated in FIG. 8D is configured with a file name 811, an extension 812, creation date and time 813, and updating date and time 814.

The file with the file name 811 being "MVIB0001" and the extension 812 being "MP4" is a chunk moving image file generated in step T604. The file with the file name 811 being "MVID0002" and the extension 812 being "MP4" is a chunk moving image file generated in step T613. The file with the file name 811 being "MVIE0003" and the extension 812 being "MP4" is a chunk moving image file generated in step T620. The file with the file name 811 being "MVIB0001" and the extension 812 being "XML" is a metadata file generated in step T610 and then updated in step T626. Since the metadata file concerned was updated by the control unit 101 of the image capturing apparatus 100 in step T626 when the last chunk moving image file was generated in step T620, the updating date and time 814 is recorded in the directory entry.

Upon the completion of processing of each notification received in strep S702, then in step S715 illustrated in FIG. 7, the control unit 201 of the communication apparatus 200 determines whether the user has issued, via the operation unit 205 of the communication apparatus 200, an instruction for ending waiting in the automatic transfer screen 504. For example, in response to the button 505 for returning to the previous screen being pressed by the user, the automatic transfer screen 504 returns back to the function selection screen 501 illustrated in FIG. 5A, so that the function of automatic transfer ends.

If it is determined that the user has issued an instruction for ending waiting in the automatic transfer screen 504 (YES in step S715), the control unit 201 of the communication apparatus 200 ends the processing in the flowchart of FIG. 7, and, if it is determined that the user has not issued such an instruction (NO in step S715), the control unit 201 of the communication apparatus 200 returns the processing to step S702, thus waiting for receiving a notification from the image capturing apparatus 100.

Thus far is the description of a method in which, when receiving a notification of generation of a metadata file, the control unit 201 of the communication apparatus 200 does not perform a request for transmission of the metadata file and reception of the metadata file and, when receiving a notification of updating of a metadata file, the control unit 201 of the communication apparatus 200 performs a request for transmission of the metadata file and reception of the metadata file.

In the case of transferring a chunk moving image file with a metadata file attached thereto to the server 300, performing operations in the first exemplary embodiment enables performing efficient communication.

Furthermore, while, in the first exemplary embodiment, a notification of updating of a metadata file is transmitted from the image capturing apparatus 100 to the communication apparatus 200 only when the last chunk moving image file has been generated, even when a chunk moving image file at the middle point has been generated, a notification of updating of a metadata file can be transmitted with, for example, a recording time being updated.

Even if a notification of updating of a metadata file is transmitted even when a chunk moving image file at the middle point has been generated, since, due to step S713 illustrated in FIG. 7, the control unit 201 of the communication apparatus 200 does not perform a request for transmission of a metadata file and reception of the metadata file, no wasteful communication is performed.

Furthermore, while, in the first exemplary embodiment, the control unit 201 of the communication apparatus 200 determines the recording method of the image capturing apparatus 100 in step S704 and step S710 and branches the processing according to a result of determination, the first exemplary embodiment is not limited to this. For example, the control unit 201 of the communication apparatus 200 can be configured to acquire information indicating that the recording method of the image capturing apparatus 100 has been changed during displaying of the function selection screen 501, thus being able to switch the function of the automatic transfer button 503 in response to the recording method being changed. For example, distinction is preliminarily set in such a manner that, in a case where the recording method of the image capturing apparatus 100 is proxy recording, the function name of the button 503 is "proxy moving image file automatic transfer" and, in a case where the recording method of the image capturing apparatus 100 is chunk recording, the function name of the button 503 is "chunk moving image file automatic transfer". Alternatively, two buttons for "proxy moving image file automatic transfer" and for "chunk moving image file automatic transfer" can be preliminarily prepared. At this time, in the flowchart of FIG. 7, step S704 and step S710 can be configured to perform processing for only one of proxy recording and chunk recording along the function name of the automatic transfer button 503.

A second exemplary embodiment of the present disclosure is described with regard to a method for determining enabling or disabling of editing of a metadata file.

The transfer application is able to display a list of files recorded on the recording medium 110 of the image capturing apparatus 100 on a transfer selection screen, and to allow the user to select various files to be transferred to the server 300 or perform editing of a metadata file attached to a moving image file. However, during a period when the image capturing apparatus 100 is performing chunk recording, even if a metadata file already generated is edited, the metadata file may be updated when recording is completed, and, therefore, data communication concerning editing may become wasteful communication.

Accordingly, the main purpose of the transfer application in the second exemplary embodiment is directed to the function of, even if a chunk moving image file and a metadata file are displayed in the transfer selection screen, disabling editing of the metadata file during a period when the image capturing apparatus 100 is performing chunk recording.

The function of disabling editing of a metadata file during a period when the image capturing apparatus 100 is performing chunk recording in the second exemplary embodiment is described in detail with reference to FIGS. 10A and 10B and FIG. 11.

The configurations of the image capturing apparatus 100 and the communication apparatus 200 are similar to those in the first exemplary embodiment and are, therefore, omitted from description.

Figure 10A:
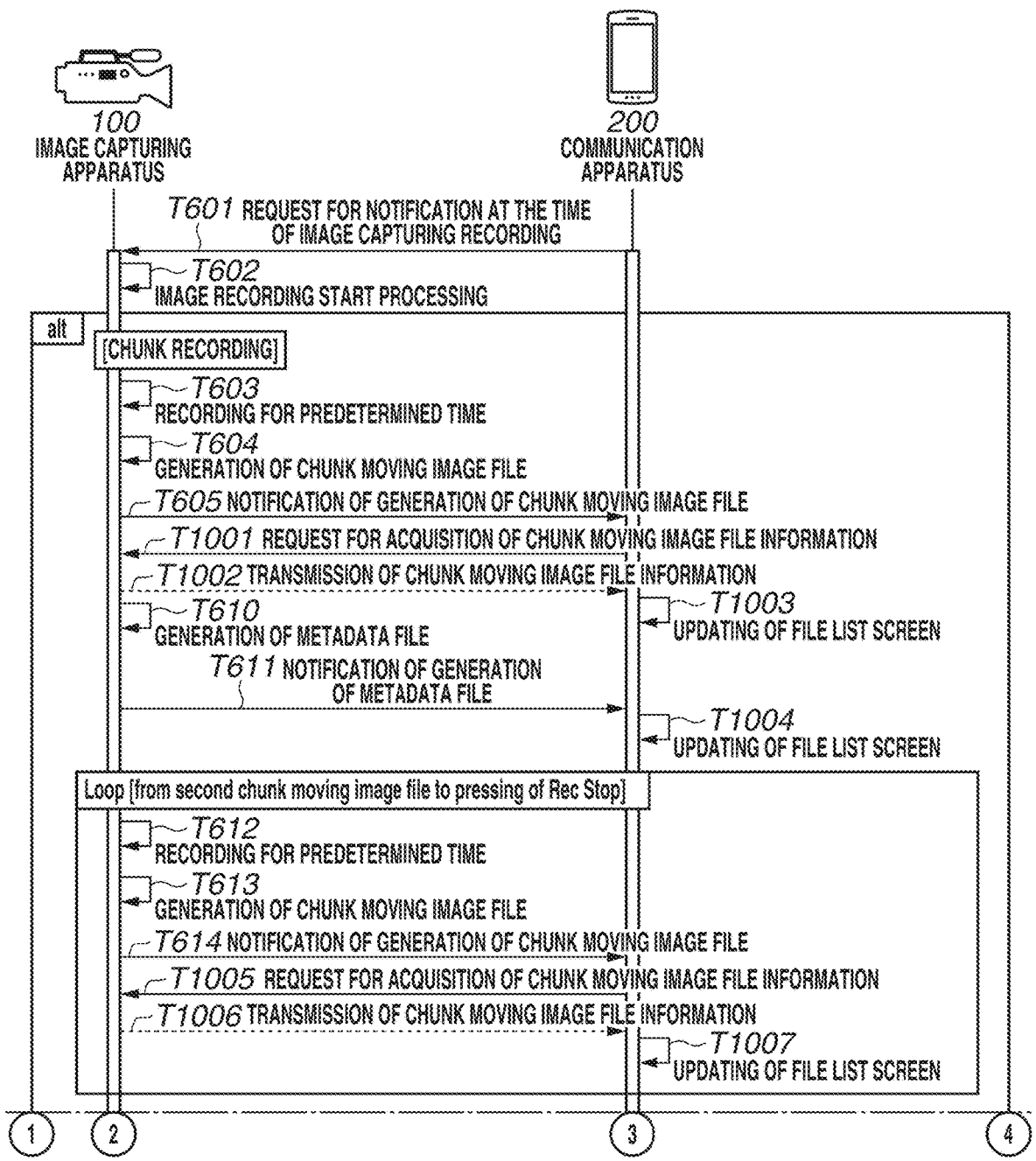
FIGS. 10A and 10B are sequences diagram of processing for enabling or disabling of editing of a metadata file which is performed between an image capturing apparatus and the communication apparatus in the second exemplary embodiment.
Figure 10B:
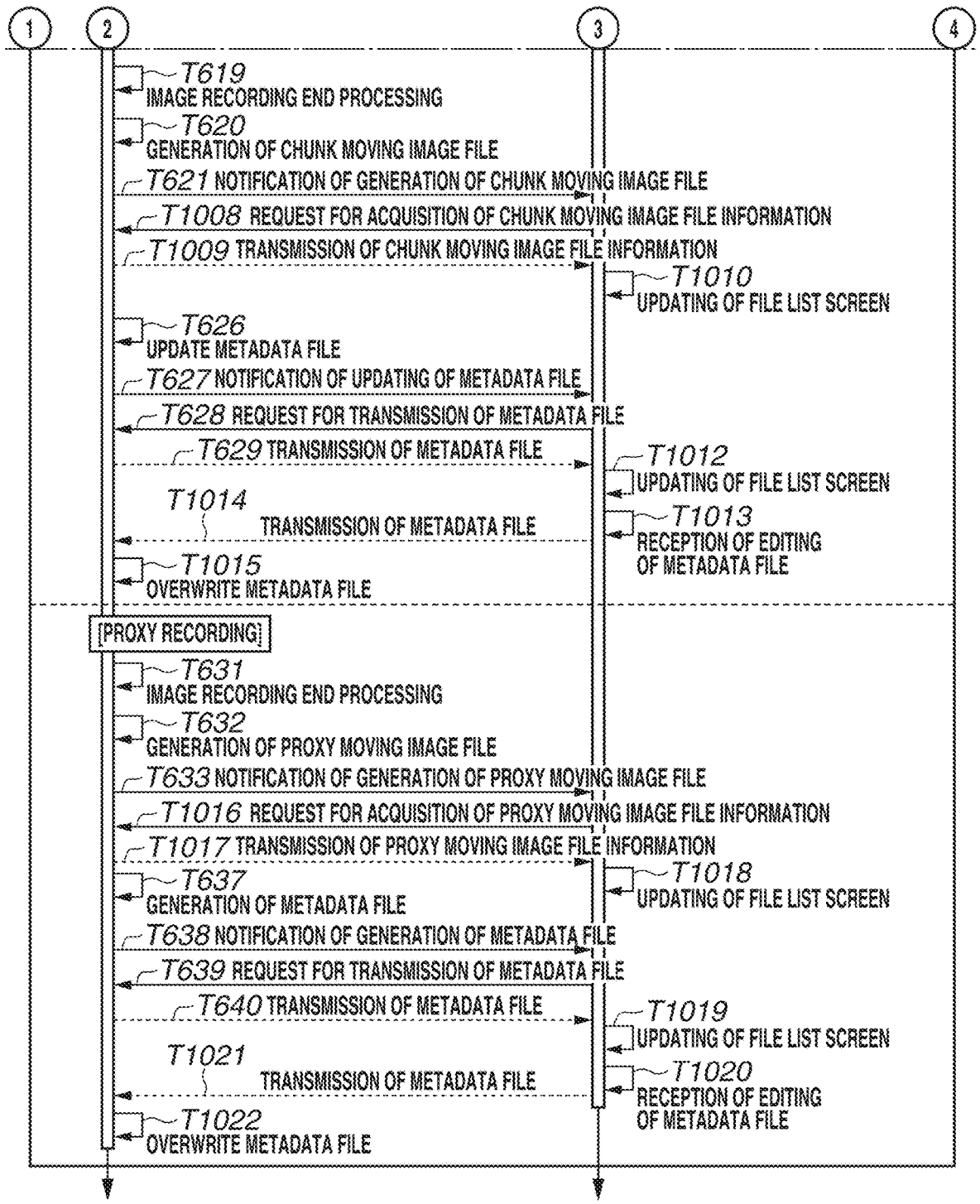
Figure 11:
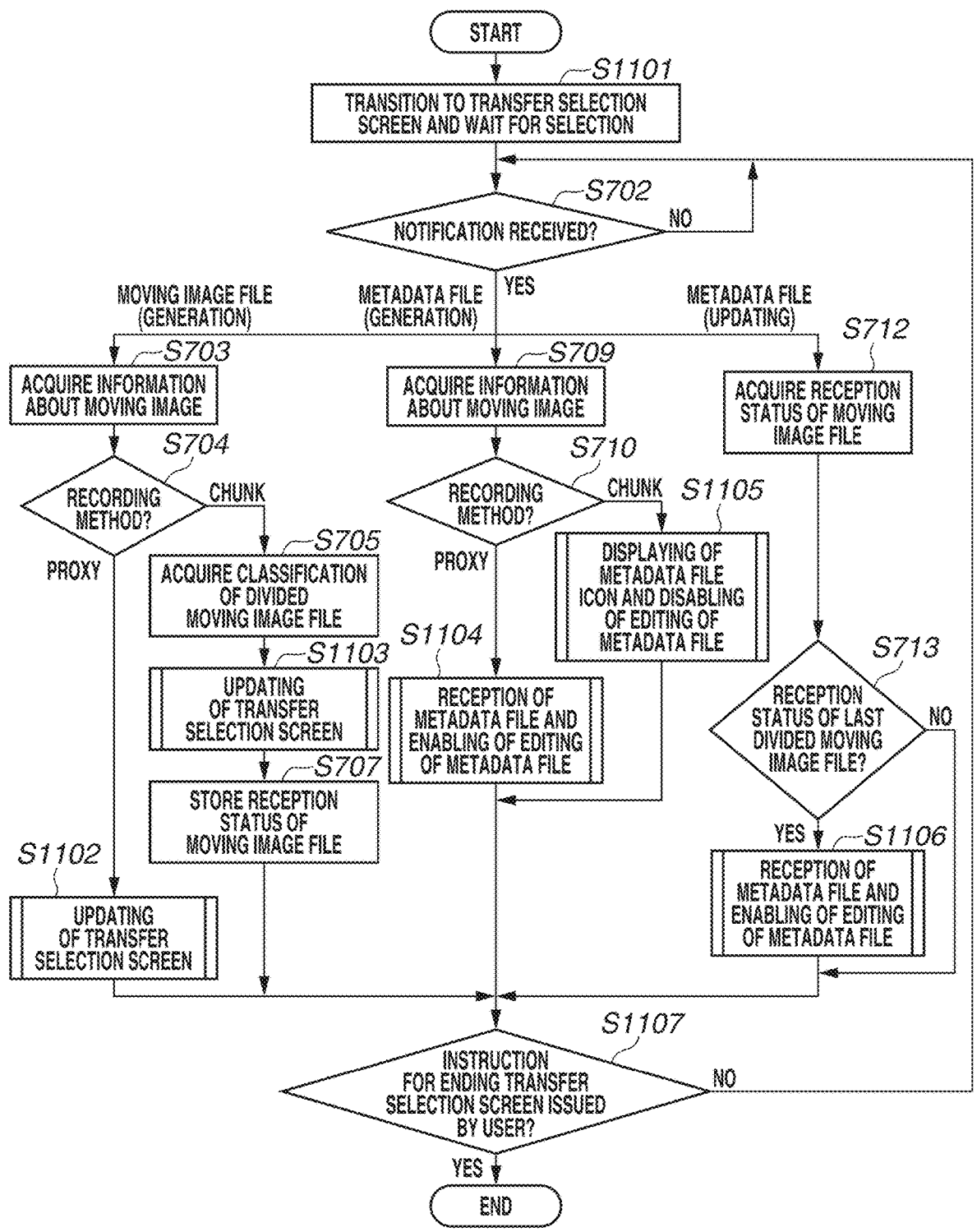
FIG. 11 is a flowchart of processing which the communication apparatus performs with regard to enabling or disabling of editing of a metadata file by the communication apparatus in the second exemplary embodiment.

Processing illustrated in FIGS. 10A and 10B and processing illustrated in FIG. 11 are started after the control unit 201 of the communication apparatus 200 displays a transfer selection screen illustrated in FIG. 9A described below in response to tapping on the intra-camera content list display button 502 in the function selection screen 501 illustrated in FIG. 5A being detected via the operation unit 205.

<Description Concerning Intra-Camera Content List Display (Transfer Selection Screen)>

First, the transfer selection screen is described with reference to FIG. 9A.

FIG. 9A is a diagram used to explain a transfer selection screen 901 of the transfer application, which is displayed on the display unit 206 of the communication apparatus 200 in response to the intra-camera content list display button 502 illustrated in FIG. 5A being pressed.

FIG. 9A illustrates an example in which each file illustrated in FIG. 8D has been displayed in a transfer selection screen 901. In the second exemplary embodiment, it is assumed that the files included in the directory entry illustrated in FIG. 8D are previously stored in the recording medium 110 of the image capturing apparatus 100.

Buttons 902 and 903 are used to change a recording medium 110 to be referred to, in a case where a plurality of recording media 110 exists in the image capturing apparatus 100. Referring to the example illustrated in FIG. 9A, a recording medium 110 indicated by the button 902, in which written characters are underlined, is currently selected, and a list of files illustrated in FIG. 8D recorded on the recording medium 110 indicated by the button 902 is displayed.

Parts 904 to 910 illustrated in FIG. 9A are generated based on information about a list of files recorded by the connected image capturing apparatus 100 and pieces of file information about the respective files.

The part 904 displays the thumbnail image of a file, and, if the file is a moving image file, displays a thumbnail image recorded in the moving image file.

The part 905 is an icon image indicating that the moving image file is a proxy moving image file.

The proxy moving image file represents a file made lighter by reducing the bit rate or resolution as compared with a normal recording file, and, in the second exemplary embodiment, if the fourth character in the file name is "P", "B", "D", or "E", it is determined that the moving image file concerned is a proxy moving image file.

A character string 906 represents a file name.

A character string 907 represents the recording date and time of a file.

The file name 906 is the file name of a chunk moving image file captured in a case where the image capturing apparatus 100 is performing chunk recording. The file name 906 illustrated in FIG. 9A indicates a file name with the fourth character "B", which is the file name of a chunk moving image file at the starting point.

A metadata file icon 908 indicates whether a metadata file representing metadata information about the moving image file exists in the same recording medium 110. In response to the user tapping the metadata file icon 908 via the operation unit 205 of the communication apparatus 200, the control unit 201 detects such tapping and then opens a metadata file editing screen (not illustrated), so that the user becomes able to edit a metadata file.

A file selection state icon 909 indicates the state of selection or non-selection of a file, and is displayed in superimposition on the thumbnail image 904. The file selection state icon 909 becomes an icon indicating the state of selection in a case where a check mark is displayed. The file selection state icon 909 becomes an icon indicating the state of non-selection in a case where the check mark is not displayed. In response to the user tapping the thumbnail image 904 of each file, selection and non-selection of the file are switched and an icon displayed as the file selection state icon 909 is also switched.

An icon 910 indicates that the moving image file concerned is a group of chunk moving image files recorded by chunk recording. With regard to the directory entry illustrated in FIG. 8D, the icon 910 indicates that files "MVIB0001.MP4", "MVID0002.MP4", "MVIE0003.MP4", and "MVIB0001.XML" are lumped together.

A button 911 is used to start transferring a file from the image capturing apparatus 100 to the communication apparatus 200 to store the file in the communication apparatus 200, and the file targeted for storing is a file which is in the above-mentioned state of selection.

In the following description, processing which is described with reference to FIGS. 10A and 10B and processing which is described with reference to FIG. 11 are assumed to be started with the state of screen displaying illustrated in FIG. 9A.

<Processing Sequence Between Image Capturing Apparatus 100 and Communication Apparatus 200>

FIGS. 10A and 10B are diagrams illustrating a processing sequence for performing displaying in list form of moving image files and a metadata file between the image capturing apparatus 100 and the communication apparatus 200 during a period from when the image capturing apparatus 100 starts recording to when the image capturing apparatus 100 ends recording.

First, a sequence which is performed in a case where the image capturing apparatus 100 performs chunk recording is described.

In FIGS. 10A and 10B, sequence steps which are in common with those in FIGS. 6A and 6B are assigned the respective same step numbers, so that the description of such sequence steps is omitted and, in the second exemplary embodiment, only differences from those in the first exemplary embodiment are described.

In response to the transfer application of the communication apparatus 200 opening the transfer selection screen 901 illustrated in FIG. 9A, the sequence illustrated in FIGS. 10A and 10B is started.

Upon receiving a notification of generation of a chunk moving image file in step T605, then in step T1001 illustrated in FIG. 10A, the communication apparatus 200 transmits, to the image capturing apparatus 100 via the communication unit 211, a request for acquisition of chunk moving image file information in such a way as to request the image capturing apparatus 100 to transmit information about the chunk moving image file to the communication apparatus 200.

Upon receiving the request for acquisition of chunk moving image file information, then in step T1002, the image capturing apparatus 100 transmits a thumbnail image of the file obtained by analyzing a meta-information storage region of the chunk moving image file to the communication apparatus 200 via the communication unit 111. Additionally, the image capturing apparatus 100 transmits chunk moving image file information including the recording date and time to the communication apparatus 200 via the communication unit 111.

Upon the completion of reception of the chunk moving image file information from the image capturing apparatus 100 in step T1002, then in step T1003 illustrated in FIG. 10A, the communication apparatus 200 updates displaying of the transfer selection screen 901 on the display unit 206. For example, the communication apparatus 200 updates the recording date and time 907 based on the chunk moving image file information acquired in step T1002.

In step T1004 illustrated in FIG. 10A, the communication apparatus 200 updates displaying of the transfer selection screen 901, which is being displayed on the display unit 206. The communication apparatus 200 displays an icon 914, which indicates a state in which editing is disabled, in a display area 912 for moving image file information targeted for a notification of generation of a metadata file received in step T611. The icon 914, which indicates a state in which editing is disabled, is displayed because, since, in the case of chunk recording, updating of a metadata file is performed in step T626 described below, updating a metadata file which is in an intermediate state results in performing wasteful communication.

Processing operations in step T1005 to step T1007 are equivalent to those in step T1001 to step T1003 and are, therefore, omitted from description. Step T612 to step T1007 are subjected to loop processing until the user presses the release switch 105a of the image capturing apparatus 100. In the second exemplary embodiment, during these processing operations, the image capturing apparatus 100 does not perform generation of a metadata file as in step T610.

In response to the user pressing the release switch 105a of the image capturing apparatus 100, the loop processing is ended, and the image capturing apparatus 100 performs image recording end processing in step T619, which has been described above with reference to FIG. 6B.

Processing operations in step T1008 to step T1010 illustrated in FIG. 10B are equivalent to the processing operations in step T1001 to step T1003 and are, therefore, omitted from description.

In step T1012 illustrated in FIG. 10B, the control unit 201 of the communication apparatus 200 stores, in the working memory 204, the metadata file which the communication apparatus 200 has received in step T629, and the communication apparatus 200 updates displaying of the transfer selection screen 901, which is being displayed on the display unit 206. Here, the control unit 201 of the communication apparatus 200 updates the icon 914, which indicates a state in which editing is disabled, displayed in a display area 912 for moving image file information targeted for a notification of updating of a metadata file received in step T627, with an icon 908, which indicates a state in which editing is enabled. This is because, due to updating of a metadata file in step T626, the metadata file is in a final state and is no more updated later on. At this time, the control unit 201 of the communication apparatus 200 enables the displaying screen of the transfer application to transition to an editing screen (not illustrated) for a metadata file in response to the user tapping the icon 908 displayed in the display area 912 for moving image file information targeted for a notification of updating of a metadata file received in step T627.

In step T1013 illustrated in FIG. 10B, the control unit 201 of the communication apparatus 200 causes the displaying screen of the transfer application to transition to the editing screen for a metadata file in response to the user operating the operation unit 205 of the communication apparatus 200, thus receiving the user performing updating of the metadata file.

In step T1014 illustrated in FIG. 10B, the control unit 201 of the communication apparatus 200 transmits the metadata file edited by the user to the image capturing apparatus 100 via the communication unit 211.

In step T1015 illustrated in FIG. 10B, the image capturing apparatus 100 overwrites, with the metadata file received in step T1014, a metadata file the file name of which is coincident with that of the received metadata file.

Next, a sequence which is performed in a case where the image capturing apparatus 100 performs proxy recording is described.

In response to the user pressing the release switch 105a of the image capturing apparatus 100, then in step T631, which has been described above with reference to FIG. 6B, the image capturing apparatus 100 performs image recording end processing.

Upon receiving a request for acquisition of proxy moving image file information from the communication apparatus 200 in step T1016, then in step T1017, the image capturing apparatus 100 transmits a thumbnail image of the file obtained by analyzing a meta-information storage region of the proxy moving image file to the communication apparatus 200 via the communication unit 111.

Additionally, the image capturing apparatus 100 transmits proxy moving image file information including the recording date and time to the communication apparatus 200 via the communication unit 111.

Upon the completion of reception of the proxy moving image file information from the image capturing apparatus 100 in step T1017, then in step T1018 illustrated in FIG. 10B, the communication apparatus 200 updates displaying of the transfer selection screen 901 on the display unit 206. For example, the communication apparatus 200 generates a new moving image file display area 912 targeted for transfer selection based on the proxy moving image file information acquired in step T1017.

Processing operations in step T1019 to step T1022 illustrated in FIG. 10B are equivalent to the processing operations in step T1012 to step T1015 and are, therefore, omitted from description.

The difference between the sequence performed in the case of proxy recording and the sequence performed in the case of chunk recording is that while, in the case of proxy recording, editing of a metadata file is enabled based on a notification of generation of a metadata file, in the case of chunk recording, editing of a metadata file is not enabled at the time of a notification of generation of a metadata file.

In the case of proxy recording, recording of a moving image file is already ended at the time point of a notification of generation of a metadata file, and, for example, a recording time is in a final state and is thus not overwritten, so that editing of a metadata file can be enabled.

Thus far is the description of a sequence in which the transfer application of the communication apparatus 200 transitions to the transfer selection screen 901, allows editing of a metadata file, and updates a metadata file stored in the image capturing apparatus 100.

<Processing Flow by Communication Apparatus 200>

Next, a processing flow which is performed by the communication apparatus 200 in the second exemplary embodiment is described with reference to FIG. 11.

The processing flow illustrated in FIG. 11 is processing which is performed in response to, as a trigger, tapping on the intra-camera content list display button 502 being detected by the operation unit 205 during displaying of the screen 501 illustrated in FIG. 5A.

In FIG. 11, processing operations which are in common with those in FIG. 7 are assigned the respective same step numbers, so that the description of such processing operations is omitted and, in the second exemplary embodiment, only differences from those in the first exemplary embodiment are described.

In step S1101 illustrated in FIG. 11, the control unit 201 of the communication apparatus 200 causes the screen displaying of the transfer application to the transfer selection screen 901 illustrated in FIG. 9A.

In step S1101, the control unit 201 of the communication apparatus 200 transmits, to the image capturing apparatus 100 via the communication unit 211, a request for notification of image recording for step T601, which has been described above with reference to FIG. 6A, in such a way as to cause the image capturing apparatus 100 to, after starting image recording, transmit various notifications. At this time, the control unit 201 of the communication apparatus 200 is in the state of waiting for reception of a notification to be received from the image capturing apparatus 100 via the communication unit 211.

<Reception of Notification of Generation of Moving Image File in the Case of Chunk Recording in Step S704>

A case where it is determined that the notification which the control unit 201 of the communication apparatus 200 has received in step S702 is a notification of generation of a moving image file and the recording method of the image capturing apparatus 100 is chunk recording in step S704 is described.

In step S705 illustrated in FIG. 11, the control unit 201 of the communication apparatus 200 acquires the classification of the chunk moving image file and stores information about the acquired classification in the working memory 204, and then in step S1103, performs updating of the transfer selection screen 901. For example, the transfer selection screen 901 displayed in a case where the chunk moving image file "MVID0006.MP4" has been generated as illustrated in FIG. 9B becomes as illustrated in FIG. 9C.

An item display area 912 indicates a chunk moving image file which is in the process of being recorded. In the item display area 912, a file name at the starting point of the chunk moving image file is displayed.

An icon 913 indicates that the chunk moving image file displayed in the item display area 912 is a file which the image capturing apparatus 100 is generating by chunk recording and chunk moving image files are in the process of being added. When the image capturing apparatus 100 has ended recording, the icon 913 is changed to the file selection state icon 909.

An icon 914 indicates that a metadata file exits in the chunk moving image file displayed in the item display area 912. The icon 914 is not displayed before the control unit 201 of the communication apparatus 200 receives a notification of generation of a metadata file and then performs step S1105 described below.

<Reception of Notification of Generation of Moving Image File in the Case of Proxy Recording in Step S704>

Next, a case where it is determined that the notification which the control unit 201 of the communication apparatus 200 has received in step S702 is a notification of generation of a moving image file and the recording method of the image capturing apparatus 100 is proxy recording in step S704 is described.

Step S1102 illustrated in FIG. 11 is processing for updating of the transfer selection screen in a case where a notification of generation of a moving image file is received in step S702 and the recording method of the image capturing apparatus 100 is proxy recording. Specifically, the communication apparatus 200 updates displaying of the transfer selection screen 901 on the display unit 206 with the proxy moving image file information described above in step T1017. In the case of proxy recording, for example, the communication apparatus 200 displays the file name "MVIP0005.MP4", which is a file name indicating proxy recording, in the item display area 912, as illustrated in FIG. 9D. On the thumbnail image, the communication apparatus 200 displays the icon 905, which indicates proxy recording, and the file selection state icon 909. A metadata file icon is not displayed before step S1104 described below is performed.

<Reception of Notification of Generation of Metadata File>

Next, a case where, in step S702, it is determined that the notification which the control unit 201 of the communication apparatus 200 has received is a notification of generation of a metadata file is described.

If, in step S710 illustrated in FIG. 11, it is determined that the recording method is proxy recording (PROXY in step S710), the control unit 201 advances the processing to step S1104, and, if it is determined that the recording method is chunk recording (CHUNK in step S710), the control unit 201 advances the processing to step S1105.

In a case where the recording method is proxy recording, in step S1104 illustrated in FIG. 11, the control unit 201 of the communication apparatus 200 performs reception of a metadata file and displaying of the metadata file icon 908 in the item display area 912 illustrated in FIG. 9D. The reception of a metadata file has been described in step T638 to step T640 and is, therefore, omitted from description. Upon detecting tapping on the metadata file icon 908, the control unit 201 of the communication apparatus 200 opens a metadata file editing screen (not illustrated), thus enabling the user to edit the metadata file.

In a case where the recording method is chunk recording, in step S1105 illustrated in FIG. 11, the control unit 201 of the communication apparatus 200 performs reception of a metadata file and displaying of the metadata file icon 914 in the item display area 912 illustrated in FIG. 9C. However, the metadata file icon 914 is displayed as a shaded icon to indicate that, since the image capturing apparatus 100 is in the process of chunk recording, editing of a metadata file is disabled.

Disabling editing of a metadata file is performed to prevent wasteful communication from occurring because, since the image capturing apparatus 100 performs update processing of a metadata file at the time of ending of chunk recording, even if editing is performed on a file in the intermediate state, the edited file may be overwritten. Therefore, since, even when detecting tapping on the metadata file icon 914, the control unit 201 does not perform any processing, the metadata file editing screen is not opened.

<Reception of Notification of Editing of Metadata File>

Next, a case where, in step S702, it is determined that the notification which the control unit 201 of the communication apparatus 200 has received is a notification of updating of a metadata file is described.

In step S1106 illustrated in FIG. 11, the control unit 201 of the communication apparatus 200 performs reception of a metadata file and changing of displaying of the metadata file icon 914 displayed in the item display area 912 illustrated in FIG. 9C to the metadata file icon 908, which indicates that editing of a metadata file is enabled. The reception of a metadata file has been described in step T627 to step T629 and is, therefore, omitted from description. Moreover, upon detecting tapping on the metadata file icon 908, the control unit 201 of the communication apparatus 200 opens a metadata file editing screen (not illustrated), thus enabling the user to edit the metadata file.

Thus far is the description of the method of preventing a metadata file stored in the image capturing apparatus 100 from being overwritten by the communication apparatus 200, by disabling reception of editing of a metadata file performed by the user via the transfer selection screen 901 before update processing of a metadata file is performed by the image capturing apparatus 100. Additionally, when the image capturing apparatus 100 has completed chunk recording and then has performed updating of a metadata file, the communication apparatus 200 enables the user to perform overwriting of the metadata file.

Accordingly, even if the communication apparatus 200 overwrites a metadata file stored in the image capturing apparatus 100 by a user operation, it is possible to prevent updating of the metadata file from being performed due to the completion of chunk recording by the image capturing apparatus 100, so that it is possible to reduce wasteful communication.

In the second exemplary embodiment, the communication apparatus 200 is configured to enable editing of a metadata file at timing when the communication apparatus 200 has completed reception of a metadata file after the image capturing apparatus 100 has completed chunk recording and the communication apparatus 200 has received a notification of updating of a metadata file. However, a configuration in which, in a case where the image capturing apparatus 100 is transferring chunk moving image files and a metadata file, the communication apparatus 200 enables editing of a metadata file after waiting for the completion of transfer can be employed.

As described above, in the case of transmitting, to an external apparatus, a moving image file obtained by chunk recording while attaching a metadata file to the moving image file, it is possible to optimize sequences for automatic transfer and editing of files and it is possible to prevent unnecessary data communication.

While various exemplary embodiments of the present disclosure have been described above, the present disclosure is not limited to these exemplary embodiments, and can be modified and altered in various manners within the scope of a gist thereof.

The present disclosure can also be implemented by processing for supplying a program for implementing one or more functions of the above-described exemplary embodiments to a system or apparatus via a network or a storage medium and causing one or more processors included in a computer of the system or apparatus to read out and execute the program. Moreover, the present disclosure can also be implemented by a circuit which implements one or more functions of the above-described exemplary embodiments (for example, an application specific integrated circuit (ASIC)).

According to an aspect of the present disclosure, it is possible to more efficiently perform transmission of a metadata file associated with a moving image file.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-087974 filed May 29, 2023, which is hereby incorporated by reference herein in its entirety.

What is claimed is:

1. A communication apparatus comprising:
at least one memory storing instructions; and
at least one processor that, upon execution of the stored instructions is configured to operate as:
a reception unit configured to receive a notification transmitted from an image capturing apparatus; and
a control unit configured to,
wherein, when the received notification indicates that a divided moving image file to be generated using a first recording method which continues moving image recording from when the image capturing apparatus receives an instruction for recording from a user until the image capturing apparatus receives an instruction for ending of recording from the user, and generates divided moving image files for every predetermined time or for every predetermined size has been generated, perform control to request the divided moving image file from the image capturing apparatus,
wherein, when the received notification indicates that a metadata file associated with the divided moving image file has been generated, perform control not to request the metadata file from the image capturing apparatus, and
wherein, when the received notification indicates that a metadata file associated with the divided moving image file has been updated, perform control to request the metadata file from the image capturing apparatus.

2. The communication apparatus according to claim 1, wherein execution of the stored instructions further configures the at least one processor to operate as the control unit configured to, when the received notification indicates that a moving image file generated in a second recording method which continues moving image recording from when the image capturing apparatus receives an instruction for recording from a user until the image capturing apparatus receives an instruction for ending of recording from the user and generates a moving image file that is based on moving image data continuously recorded until then has been generated, perform control to request the moving image file from the image capturing apparatus, and
wherein, when the received notification indicates that a metadata file associated with the moving image file has been generated, perform control to request the metadata file associated with the moving image file from the image capturing apparatus.

3. The communication apparatus according to claim 1, wherein execution of the stored instructions further configures the at least one processor to operate as the control unit configured to determine that, based on a file name of a divided moving image file included in the notification, the notification is a notification indicating that the divided moving image file has been generated.

4. The communication apparatus according to claim 1, wherein execution of the stored instructions further configures the at least one processor to operate as the control unit configured to determine that, based on a file name of a divided moving image file included in the notification, the notification is a notification indicating that a metadata file associated with the divided moving image file has been generated.

5. The communication apparatus according to claim 1, wherein execution of the stored instructions further configures the at least one processor to operate as the control unit configured to determine that, based on a file name of a divided moving image file included in the notification, the notification is a notification indicating that a metadata file associated with the divided moving image file has been updated.

6. The communication apparatus according to claim 1, wherein execution of the stored instructions further configures the at least one processor to operate as the control unit configured to determine that, based on a file name of a moving image file included in the notification, the notification is a notification indicating that the moving image file has been generated.

7. The communication apparatus according to claim 1, wherein execution of the stored instructions further configures the at least one processor to operate as the control unit configured to determine that, based on a file name of a moving image file included in the notification, the notification is a notification indicating that a metadata file associated with the moving image file has been generated.

8. The communication apparatus according to claim 1, wherein each of the divided moving image file and the moving image file is a proxy moving image file.

9. The communication apparatus according to claim 1,
wherein execution of the stored instructions further configures the at least one processor to operate as the control unit configured to sequentially transmit the received divided moving image files to a server, and
transmit, to the server, a metadata file associated with the received divided moving image files after all of the received divided moving image files have been transmitted.

10. The communication apparatus according to claim 1, wherein transmission of the received divided moving image file to a server and reception of the divided moving image file are performed in parallel.

11. A control method for a communication apparatus, the control method comprising:
receiving a notification transmitted from an image capturing apparatus;
when the received notification indicates that a divided moving image file to be generated using a first recording method which continues moving image recording from when the image capturing apparatus receives an instruction for recording from a user until the image capturing apparatus receives an instruction for ending of recording from the user and generates divided moving image files for every predetermined time or for every predetermined size has been generated, performing control to request the divided moving image file from the image capturing apparatus;
when the received notification indicates that a metadata file associated with the divided moving image file has been generated, performing control not to request the metadata file from the image capturing apparatus; and
when the received notification indicates that a metadata file associated with the divided moving image file has been updated, performing control to request the metadata file from the image capturing apparatus.

12. A non-transitory computer-readable storage medium storing instructions that, when executed by one or more processors of a communication apparatus, cause the communication apparatus to execute a control method, the control method comprising:
receiving a notification transmitted from an image capturing apparatus;
when the received notification indicates that a divided moving image file to be generated using a first recording method which continues moving image recording from when the image capturing apparatus receives an instruction for recording from a user until the image capturing apparatus receives an instruction for ending of recording from the user and generates divided moving image files for every predetermined time or for every predetermined size has been generated, performing control to request the divided moving image file from the image capturing apparatus;
when the received notification indicates that a metadata file associated with the divided moving image file has been generated, performing control not to request the metadata file from the image capturing apparatus; and
when the received notification indicates that a metadata file associated with the divided moving image file has been updated, performing control to request the metadata file from the image capturing apparatus.

* * * * *